(12) United States Patent
Ueyama et al.

(10) Patent No.: US 7,184,384 B2
(45) Date of Patent: Feb. 27, 2007

(54) OPTICAL PICKUP

(75) Inventors: Tetsuo Ueyama, Nara (JP); Keiji Sakai, Nara (JP); Renzaburou Miki, Soraku-gun (JP); Osamu Miyazaki, Soraku-gun (JP); Yukio Watanabe, Uji (JP)

(73) Assignee: Sharp Kabushiki Kaisha, Osaka (JP)

( * ) Notice: Subject to any disclaimer, the term of this patent is extended or adjusted under 35 U.S.C. 154(b) by 82 days.

(21) Appl. No.: 10/512,188

(22) PCT Filed: Apr. 18, 2003

(86) PCT No.: PCT/JP03/05022

§ 371 (c)(1),
(2), (4) Date: Oct. 22, 2004

(87) PCT Pub. No.: WO03/091999

PCT Pub. Date: Nov. 6, 2003

(65) Prior Publication Data

US 2005/0180293 A1    Aug. 18, 2005

(30) Foreign Application Priority Data

Apr. 24, 2002  (JP)  ............................. 2002-121584
Nov. 21, 2002  (JP)  ............................. 2002-337853

(51) Int. Cl.
G11B 7/00    (2006.01)

(52) U.S. Cl. .............................. 369/112.05; 369/44.37; 369/44.23

(58) Field of Classification Search ........... 369/112.05, 369/44.37, 44.26

See application file for complete search history.

(56) References Cited

U.S. PATENT DOCUMENTS 5,111,449 A * 5/1992 Kurata et al. ............ 369/44.37

(Continued)

FOREIGN PATENT DOCUMENTS

JP    04-34212    6/1992

(Continued)

OTHER PUBLICATIONS

Ueyama et al., "A Novel Tracking Servo System for Multi-Types of DVD with Phase-Shift DPP Method," Joint International Symposium on Optical Memory and Optical Data Storage 2002.

(Continued)

*Primary Examiner*—Thang V. Tran
*Assistant Examiner*—Van T. Pham
(74) *Attorney, Agent, or Firm*—David G. Conlin; Steven M. Jensen; Edwards Angell Palmer & Dodge LLP

(57) ABSTRACT

An optical pickup converts a laser beam from a semiconductor laser (1) into a parallel ray with a collimator lens (2), and divides it into a main beam (30), a sub-beam (+1st order component) (31), and a sub-beam (−1st order component) (32) with a gradient multiple-division type phase difference grating (3). After passing through a beam splitter (4), an objective lens (5) condenses the light beams on a track (61) of an optical disc (6), and the reflected light that has passed through the objective lens 5 is reflected at the beam splitter (4) and is guided into optical detectors (8A, 8B, and 8C) by a condensing lens (7). Accordingly, in a tracking error signal detecting method using the push-pull signals of the main beam and sub-beams, an offset produced by an objective lens shift or a disc tilt can be cancelled at low cost without lowering the efficiency of using light.

33 Claims, 25 Drawing Sheets

U.S. PATENT DOCUMENTS

| | | | |
|---|---|---|---|
| 5,475,670 A | * 12/1995 | Hamada et al. | 369/112.07 |
| 5,835,471 A | * 11/1998 | Miyamoto et al. | 369/112.07 |
| 5,886,964 A | 3/1999 | Fujita | |
| 2003/0007436 A1 | * 1/2003 | Komma et al. | 369/53.2 |
| 2003/0179373 A1 | * 9/2003 | Magnusson et al. | 356/328 |

FOREIGN PATENT DOCUMENTS

| | | |
|---|---|---|
| JP | 09-081942 | 3/1997 |
| JP | 2001-250250 | * 9/2001 |

OTHER PUBLICATIONS

Ueyama et al., "A Novel Tracking Servo System for Multitypes of Digital Versatile Disks Using Phase-Shift Differential Push-Pull Method," Appl. Phys. vol. 42 pp. 952-953 (2003).

Ueyama et al., "A New Tracking Servo System using a Phase-Shift Differential Push-Pull Method for Recordable Optical Disks," Joint International Symposium on Optical Memory and Optical Data Storage 2003.

* cited by examiner (OPTICAL BEAM)

REGION B WHERE GRATING GROOVE IS OFFSET BY 1/2 PITCH (HATCHED PORTION)

(ENLARGED VIEW OF DOTTED CIRCLE IN FIG. 1(b))

REGIONS n1 TO n4 ASSOCIATED WITH PUSH-PULL SIGNALS

OPTICAL BEAM

CROSSING REGION
NON-CROSSING REGION

CROSSING REGION
NON-CROSSING REGION

CROSSING REGION   NON-CROSSING REGION

CROSSING REGION   NON-CROSSING REGION

OPTICAL BEAM

OPTICAL BEAM

OPTICAL BEAM

PUSH-PULL SIGNALS IN THE CASE THAT OBJECTIVE LENS SHIFTS

PUSH-PULL SIGNALS IN THE CASE THAT OBJECTIVE LENS SHIFTS (OPTICAL BEAM)

PUSH-PULL SIGNALS IN THE CASE
THAT OBJECTIVE LENS SHIFTS (OPTICAL BEAM)

PUSH-PULL SIGNALS IN THE CASE THAT OBJECTIVE LENS SHIFTS

PUSH-PULL SIGNAL

PUSH-PULL SIGNALS IN THE CASE
THAT OBJECTIVE LENS SHIFTS

OPTICAL PICKUP

TECHNICAL FIELD

The present invention relates to an optical pickup that optically records and reproduces information in and from an information recording medium such as an optical disc, optical card and the like. The invention also relates to a tracking servo method that corrects an offset generated in tracking error signals both easily and at low cost.

BACKGROUND ART

In recent years, since optical discs can record a large amount of information signals with high density, they are used in many fields, such as audios, videos, computers and so on. Especially, the amount of data such as moving image information dealt with by computers etc. has been increasing drastically over the last years. With this, the capacity of optical discs has also been increasing by with a smaller recording pit and track pitch.

In the information recording medium, in order to reproduce information signals recorded by a micron unit, it is necessary to accurately track information tracks by optical beams. Although various methods have been known as a detection method of a tracking error signal (TES), the push-pull method is known as the simplest method. However, in the push-pull method, an offset is generated in TES when an objective lens shifts radially during tracking, or when the disc tilts. Then, as a method to cancel the offset, a method using three beams (differential push-pull (DPP) method) is disclosed in Japanese Patent No. 1756739 (published on May 13, 1986).

Moreover, in order to improve the DPP method and to omit a rotation adjustment for three beams on a disc, Japanese Publication for Unexamined Patent Application No. 250250/2001 (Tokukai 2001-250250, published on Sep. 14, 2001) proposes a new tracking method (will be referred to as "phase shift DPP method" hereinafter). This method is explained with reference to FIG. 31 to FIG. 34.

For example, as shown in FIG. 31(a), a laser beam from a semiconductor laser 1 is converted into a parallel ray with a collimator lens 2, and is divided into a main beam 30 a sub-beam 31 (+1st order component), and a sub-beam 32 (−1st order component) with a grating 3. After passing through a beam splitter 4, the three beams are condensed on a track 61 of an optical disc 6 with an objective lens 5. The reflected light of the three beams are reflected off the beam splitter 4 through the objective lens 5, and a condensing lens 7 guides the light to optical detectors 8 (8A, 8B, and 8C).

As shown in FIG. 32, the far field patterns of the reflected light of the main beam 30 and the sub beams 31 and 32 are received by the two-part optical detectors 8A, 8B, and 8C, which respectively have dividing lines corresponding to a track direction. The two-part optical detectors 8A, 8B, and 8C produce push-pull signals PP30, PP31, and PP32, respectively, which are differential signals.

Here, as shown in FIG. 31(b), an X-Y coordinate system is set up. The center of the beam is an origin, the radial direction of the disc is an x direction, and the track direction orthogonal to the radial direction is a y direction. In the grating 3, the phase of a periodic structure of the track groove in the first quadrant is 180-degree out of phase from that of other quadrants. Accordingly, the sub beams 31 and 32 diffracted by the groove portion have a 180-degree phase difference only in the first quadrant. Here, as shown in FIG. 33, the amplitudes of the push-pull signals PP31 and PP32 using the sub beams 31 and 32 become substantially 0 compared with the push-pull signal PP30 of the main beam that does not have a phase difference. This is because no push-pull signal is detected regardless of the position on the track and the signals are substantially the same regardless of whether the sub beams 31 and 32 fall on the same track as the main beam 30, or on a different track.

In contrast, as shown in FIG. 34, as for an offset of TES by objective lens shifting or disc tilting, the PP30 and PP31 (PP32) generate offsets Δp and Δp' on the same side (in-phase) according to their respective light intensities. Therefore, by solving the following equation $$PP34 = PP30 - k(PP31 + PP32) = PP30 - k \cdot PP33,$$

a differential push-pull signal PP34 which has canceled the above offsets can be detected.

In the equation, the coefficient k is for correcting a difference in the light intensity between the 0 order component 30 and the +1st order component 31, and between the 0 order component 30 and the −1 order component 32. When the intensity ratio of 0 order component: +1st order component: −1st order component=a:b:b, the coefficient k=a/(2b). PP33 is the sum of push-pull signals of the sub beams 31 and 32. The principle as to why push-pull signals of the sub beams do not generate (amplitude 0) is omitted here. In this way, the amplitudes of push-pull signals of the sub beams become 0 regardless of the depth of the groove. That is, since the amplitudes are 0 wherever on a track the three beams locate, position adjustment (rotation adjustment of the diffraction grating, etc.) of the three beams becomes unnecessary, and assembly adjustment of the pickup can be simplified drastically.

Moreover, in the case that a hologram laser unit is used, a region actually swept by the sub beams is shifted from a region swept by the main beam on the diffraction grating, particularly when a phase-shifting diffraction grating is placed in the vicinity of the light source of the semiconductor laser. As a result, the two sub beams cannot have a common optimum phase shift. Even if it is possible to add an optimum phase shift pattern for the pitch or depth of a given optical disk, there remains a problem that it cannot be applied to an optical disc that has a different pitch. The foregoing conventional examples propose phase shift patterns that accommodate such a problem.

(Document 1)

Japanese Patent No. 1756739 (pages 1 to 4, FIGS. 1 to 3)

(Document 2)

Japanese Publication for Unexamined Patent Application No. 250250/2001 (pages 6 to 10, FIGS. 1 to 3)

However, in the case that the above phase shift grating is used, a region to which a phase shift is added needs to be optimally designed according to the push-pull pattern, i.e., the pitch or depth of the optical disc, the magnification of the optical system, or the NA (numerical aperture) used on a light source side. Therefore, the characteristics deteriorate when the width or position of the phase shift region shifts from the designed value due to fabrication error, or when the optical parameter of the pickup in which the grating is installed is changed.

Furthermore, even with the pattern that is designed to accommodate discs of different pitches, the conventional arrangements can only accommodate only two kinds of pitches. As a result, the characteristics deteriorate greatly when there is a pitch shift, or when a disc of a different pitch is used.

Moreover, the characteristics also deteriorate when a relative position of the objective lens shifts during assembly. A change in the objective lens shift characteristic during tracking is also large and there is a limit. Therefore, in the above conventional techniques, there are problems of versatility or mass-productivity, owning to the fact that they require small assembling tolerance, and individual phase shift pattern designing suitable for different optical systems or optical discs.

The present invention was made to solve the above problems, and an object of the invention is to provide a low-cost TES detection method using a phase shift DPP method, and an optical pickup employing same, (i) that can be installed in optical systems of optical pickups having different specifications, (ii) that are applicable to optical discs of different pitches or groove depths, and (iii) that undergo only small characteristic drop and improve objective lens shift characteristics even when there is a large assembly or design tolerance.

DISCLOSURE OF INVENTION

To achieve the above object, the present invention is configured as follows.

A first optical pickup of the present invention includes: a light emitting element; condensing means for condensing on an optical recording medium an optical beam emitted from the light emitting element; an optical diffraction element, provided between the light emitting element and the condensing means, for dividing the optical beam from the light emitting element into three or more beams including a main beam and sub beams; and an optical detection system with a light receiving element which receives reflected light from the optical recording medium by dividing the reflected light by a dividing line that substantially coincides with a track direction of the optical recording medium, wherein: the optical diffraction element includes first and second grating patterns with grooves and lands that are formed along a direction substantially perpendicular to the track direction of the optical recording medium, the grooves and lands of the first grating pattern and the grooves and lands of the second grating pattern being shifted from each other by a predetermined pitch in the direction the first and second grating patterns are formed, and the first and second grating patterns being formed in the shape of a band and being tilted in a first region and a second region that adjoin in a direction substantially perpendicular to the track direction.

According to the above structure, the grooves and lands of the first and second grating patterns in the optical diffraction element are shifted from each other by a predetermined pitch in the direction of the first and second grating patterns. The first and second grating patterns are formed in the shape of a band and are tilted in a first region and a second region that adjoin in the direction perpendicular to the track direction.

Therefore, in the regions where light and dark areas of push-pull are generated in the reflected light from the optical disc, the phase shift regions, which correspond to the first grating pattern or the second grating pattern, cross and are divided into smaller regions. As a result, the regions, where brightness inversion occurs, can have substantially equal area. Therefore, the regions in which brightness inversion occurs can be substantially equal in any off-track state, and a push-pull component can be suppressed.

Moreover, when condensing means, such as the objective lens, shifts in a radial direction by tracking, a relative position to the optical diffraction element shifts, and the phase shift regions also shift. However, in the regions where light and dark areas of the push-pull are generated, since the phase shift regions cross as in a state that there is no condensing means shifting, the amplitude of the push-pull signal can be suppressed. Therefore, the characteristics are not impaired by the objective lens shifting, and the shift characteristics improve.

A second optical pickup of the present invention, in the first optical pickup, may be arranged so that the grooves and lands of the first grating pattern and the grooves and lands of the second grating pattern are shifted from each other by half a pitch of the grooves and lands.

A third optical pickup of the present invention, in the second optical pickup, may be arranged so that the first grating pattern and the second grating pattern of the optical diffraction element are tilted with respect to a border line (border line of the first grating pattern and the second grating pattern) substantially parallel to a track of the optical recording medium.

A fourth optical pickup of the present invention, in the third optical pickup, may be arranged so that the first grating pattern and the second grating pattern are formed substantially symmetrical about the border line that extends substantially parallel to the track.

A fifth optical pickup of the present invention, in the third optical pickup, may be arranged so that the first grating pattern and the second grating pattern are formed asymmetrical about the border line that extends substantially parallel to the track.

A sixth optical pickup of the present invention, in any one of the first to sixth optical pickups, may be arranged so that the first grating pattern and the second grating pattern of the optical diffraction element are tilted at an angle in a range of from 35 degrees to 55 degrees with respect to the track direction.

A seventh optical pickup of the present invention, in any one of the third to sixth optical pickups, may be arranged so that the first grating pattern and the second grating pattern are tilted with respect to the border line that extends substantially parallel to the track, so that a sum of tilt angles on both sides of the border line is substantially 90 degrees.

An eighth optical pickup of the present invention, in any one of the first to sixth optical pickups, may be arranged so that the optical pickup accommodates a recordable optical disc with a non-recorded area and a recorded area, and the first grating pattern and the second grating pattern of the optical diffraction element are tilted at an angle in a range of from 55 degrees to 75 degrees with respect to the track direction.

The tilt angle may also be set in a range between 35 and 75 degrees.

A ninth optical pickup of the present invention, in any one of the first to eighth optical pickups, may be arranged so that the first grating pattern and the second grating pattern have a constant width in a direction parallel to the track direction of the optical recording medium, and are periodically formed at regular intervals.

A tenth optical pickup of the present invention, in any one of the first to eighth optical pickups, may be arranged so that the first grating pattern and the second grating pattern have a constant width in a direction parallel to the track direction of the optical recording medium, and are formed at irregular intervals.

An eleventh optical pickup of the present invention, in any one of the first to eighth optical pickups, may be arranged so that the first grating pattern and the second grating pattern have a width that continuously varies in a direction parallel to the track direction of the optical recording medium.

A twelfth optical pickup of the present invention, in any one of the first to eleventh optical pickups, may be arranged so that the first grating pattern and the second grating pattern are formed in edge portions of a region swept by the optical beam emitted from the light emitting element.

A thirteenth optical pickup of the present invention, in the twelfth optical pickup, may be arranged so that the edge portions are separated by a distance L centering on the border line parallel to the track and in a direction perpendicular to the track direction.

The fourteenth optical pickup of the present invention, in the twelfth or thirteenth optical pickup, may be arranged so that a region where the first and second grating patterns are not formed and are swept by the optical beam has gratings (grooves and lands) that are formed at the same pitch as the first and second grating patterns and in a direction substantially perpendicular to the track direction.

A fifteenth optical pickup of the present invention, in any one of the twelfth to fourteenth optical pickups, may be arranged so that the distance L which separates the first grating pattern and the second grating pattern is 10% to 60% of a diameter of the optical beam that passes there through.

A sixteenth optical pickup of the present invention, in any one of the first to fifteenth optical pickups, may be arranged so that the gratings and the grating patterns are formed so that a strongest intensity peak generates in a central portion of a spot pattern formed on the optical recording medium by the sub beams divided by the diffraction element.

A seventeenth optical pickup of the present invention, in any one of the first to sixteenth optical pickups, may be arranged so that, in the optical detection system produces a tracking signal using push-pull signals, based on an output of the light receiving element that receives the main beam and the sub beams by dividing the main beam and the sub beams by the dividing line that substantially coincides with the track direction of the optical recording medium, the optical detection system produces a tracking signal by subtraction of normalized push-pull signals that are obtained by normalizing respective push-pull signals of the main beam and the sub beams with total light quantities of the respective beams.

An eighteenth optical pickup of the present invention is an optical pickup in which an optical beam emitted from a light emitting element is divided into a main beam and sub beams that are condensed on an optical recording medium with an objective lens, and reflected light of the main beam and the sub beams is received by being divided by a dividing line substantially parallel to a track direction so as to detect an optical signal, the optical pickup correcting a tracking error signal offset of the main beam using push-pull signals of the sub beams with a phase difference, wherein the phase difference is given in such a manner that a region of phase difference by a 0 order component of diffraction light generated by a groove of the optical recording medium and a region of phase difference by ±1st order components of diffraction light generated by a groove of the optical recording medium overlap in a region associated with the push-pull signals of the sub beams.

A nineteenth optical pickup of the present invention, in the eighteenth optical pickup, may be arranged so that the phase difference is given in such a manner that amplitudes of the push-pull signals of the sub beams become substantially 0 by the overlapping regions of phase difference.

A twentieth optical pickup of the present invention, in the eighteenth or nineteenth optical pickup, may be arranged so that the phase difference rendered to the sub beams is substantially 180 degrees.

A twenty-first optical pickup of the present invention is an optical pickup in which an optical beam emitted from a light emitting element is divided into a main beam and sub beams that are condensed on an optical recording medium with an objective lens, and reflected light of the main beam and the sub beams is received by being divided by a dividing line substantially parallel to a track direction so as to detect an optical signal, the optical pickup correcting a tracking error signal offset of the main beam using the push-pull signals of the sub beams with a phase difference rendered by an optical diffraction element, wherein the optical diffraction element gives the phase difference in such a manner that a region of phase difference by a 0 order component of diffraction light generated by a groove of the optical recording medium and a region of phase difference by ±1st order components of diffraction light generated by a groove of the optical recording medium overlap in a region associated with the push-pull signals of the sub beams.

A twenty-second optical pickup of the present invention, in the twenty first optical pickup, may be arranged so that the optical diffraction element includes first and second grating patterns with grooves and lands that are formed in a direction substantially perpendicular to the track direction of the optical recording medium, the grooves and lands of the first grating pattern and the grooves and lands of the second grating pattern being shifted by a predetermined pitch in the direction the first and second grating patterns are formed, and being formed in the shape of a band.

A twenty-third optical pickup of the present invention, in the twenty-second optical pickup, may be arranged so that the grooves and lands of the first grating pattern and the grooves and lands of the second grating pattern are shifted from each other by half a pitch of the grooves and lands.

A twenty-fourth optical pickup of the present invention, in the twenty-first optical pickup, may be arranged so that the first and second grating patterns are formed in the shape of a concentric circle or a curve.

A twenty-fifth optical pickup of the present invention, in any one of the first to twenty-fourth optical pickups, may be arranged to include a hologram laser unit, which is an integrated single package of: the light emitting element; the optical diffraction element; and the optical detection system, including a hologram and the light receiving element, which receives reflected light by dividing the reflected light by the dividing line that substantially coincides with the track direction of the optical recording medium.

Additional objects, features, and strengths of the present invention will be made clear by the description below. Further, the advantages of the present invention will be evident from the following explanation in reference to the drawings.

BEST MODE FOR CARRYING OUT THE INVENTION

Figure 1:
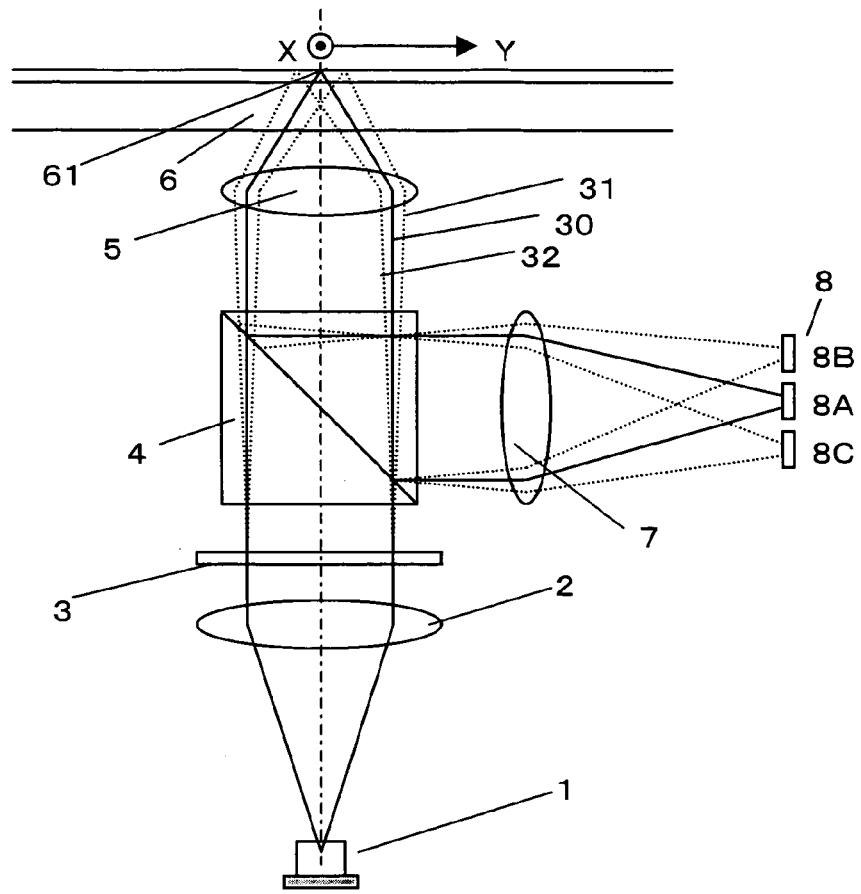
FIG. 1(a) is a schematic diagram showing a structure of an optical system of an optical pickup in accordance with a First Embodiment of the present invention.
FIG. 1(b) is an explanatory diagram showing a structure of a diffraction grating shown in FIG. 1(a)
FIG. 1(c) is an enlarged view of the grating shown in FIG. 1(b).
Figure 1:
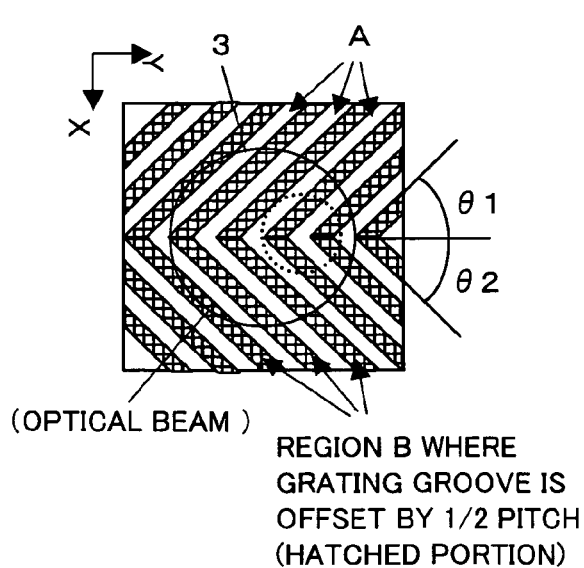
Figure 1:
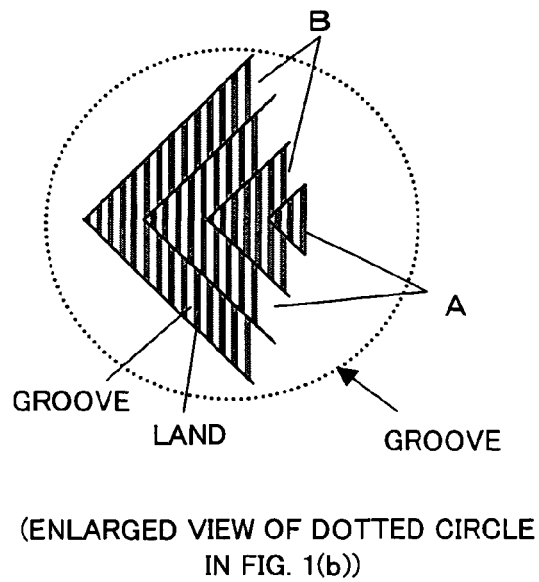

Embodiments of the present invention are explained in detail with reference to drawings. Note that, the same reference numerals are used for the members already described in conjunction with the above conventional example, and further explanations thereof are omitted.

First Embodiment

The First Embodiment of the present invention is explained in detail using FIG. 1 through FIG. 7. FIG. 1($a$) is a schematic cross sectional view of a pickup of the present invention, FIG. 1($b$) is a top view of a grating 3, which is the most characteristic grating of the present invention, and inside the circle is a partial enlarged view showing the grating 3 in detail. A structure of an optical pickup of the present invention is explained below particularly in regard to light paths of optical beams.

In an optical pickup, a laser beam that comes out of a semiconductor laser 1 is converted by a collimator lens 2 into parallel rays, which are then divided by the grating 3 into a main beam 30, a sub beam (+1st order component) 31, and a sub beam (−1st order component) 32. After passing through a beam splitter 4, these three beams are condensed on a track 61 of an optical disc 6 as they pass through the objective lens 5. The three beams reflect off the optical disc into the objective lens 5, and are again reflected by the beam splitter 4 into an optical detector 8 (8A, 8B, 8C) through a condenser 7.

Figure 2:
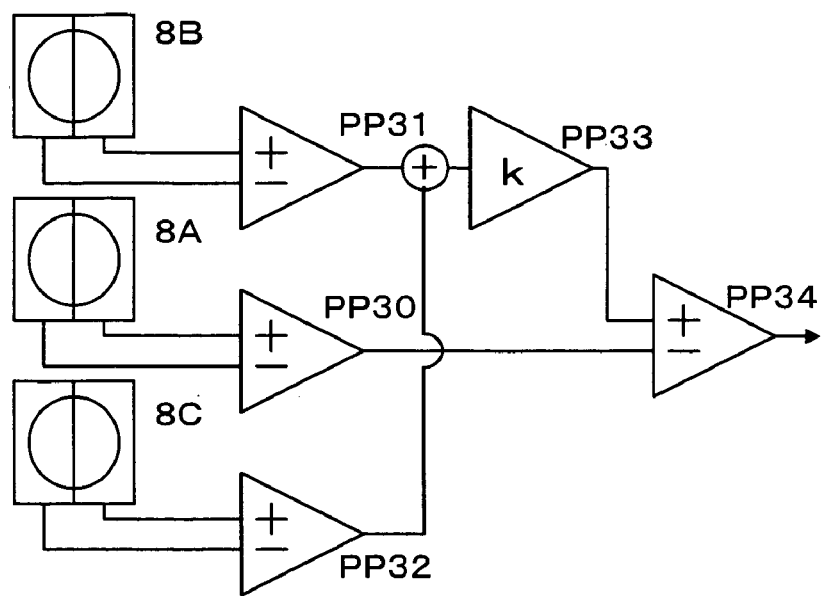
FIG. 2 is an explanatory diagram showing a structure of a detection system in the optical pickup in accordance with the First Embodiment of the present invention.

FIG. 2 is a schematic diagram showing a far field pattern of reflected light for the main beam 30 and the sub beams 31 and 32, and its detection circuit. The respective optical beams condensed on the optical detector 8 (8A, 8B, 8C) are detected by two-part optical detectors 8A, 8B, and 8C which have a dividing line corresponding to the track direction, and the two-part optical detectors 8A, 8B, and 8C produce differential signals as push-pull signals PP30, PP31, and PP32, respectively.

As described in the present embodiment, the grating 3, which is a diffraction grating that generates the three beams, is characterized by its groove structure, as explained below with reference to FIG. 1(*b*) and FIG. 1(*c*).

As shown in FIG. 1(*b*), an X-Y coordinate system is set up in the grating 3. The center of a region passed by an optical beam is the origin, a radial direction which corresponds to the radial direction of an optical disc is the x direction, and the track direction is the y direction. The grating 3 has a first grating pattern A (region A) and a second grating pattern B (region B), which are alternately formed in the form of a band. The first grating pattern A and the second grating pattern B form a V-shape by being inclined in mutually opposite directions in a first region and a second region separated by the y axis, i.e., the track direction of an optical disc.

As shown in FIG. 1(*c*), the first grating pattern A has region A with alternately formed recessed and raised portions (groove and land) making up the grating and perpendicular to the track direction. Similarly, the second grating pattern B has region B with alternately formed recessed grooves and raised lines (groove and land) making up the grating and perpendicular to the track direction. Furthermore, the pitch of land groove for the second grating pattern B is the same as for the first grating pattern A. However, the relative position of the grating groove or recessed groove (or the grating line or raised line (land)) is offset by ½ pitch with respect to the first grating pattern A. That is, the land and groove are inverted in region A (the first grating pattern A) and region B (the second grating pattern B). With such a structure, the region A and region B have a phase difference of 180 degrees. Therefore, assuming that the region A has no phase difference, the region B has a phase difference of 180 degrees. As described herein, the region A of the first grating pattern A and the region B of the second grating pattern B are formed alternately with substantially equal intervals.

The optical beam is divided into a main beam and sub beams as it passes through the grating 3 described above, and ±1 st order components of the respective beams generated on the grooves and lands or track of the optical disk have a phase difference of ±180 degrees.

Figure 3:
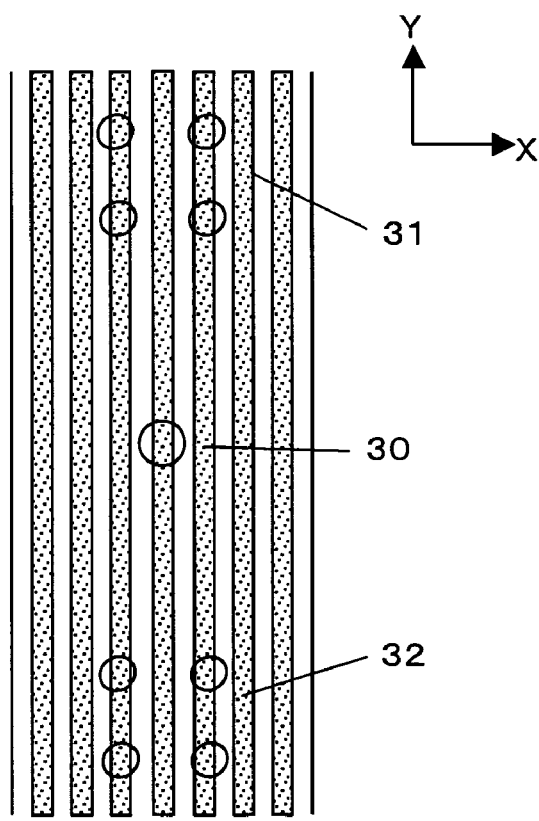
FIG. 3 is an explanatory diagram showing a beam spot shape on optical discs, when the optical pickup in accordance with the First Embodiment of the present invention is used.
Figure 33:
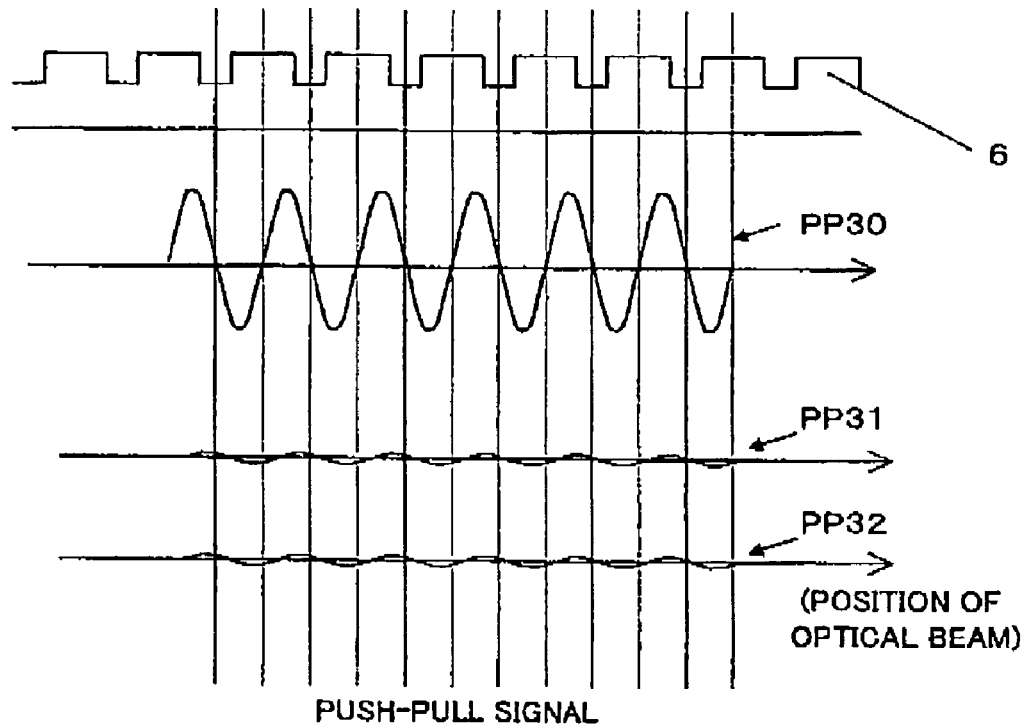
FIG. 33 is a diagram explaining push-pull signals in a phase shift DPP method.
Figure 34:
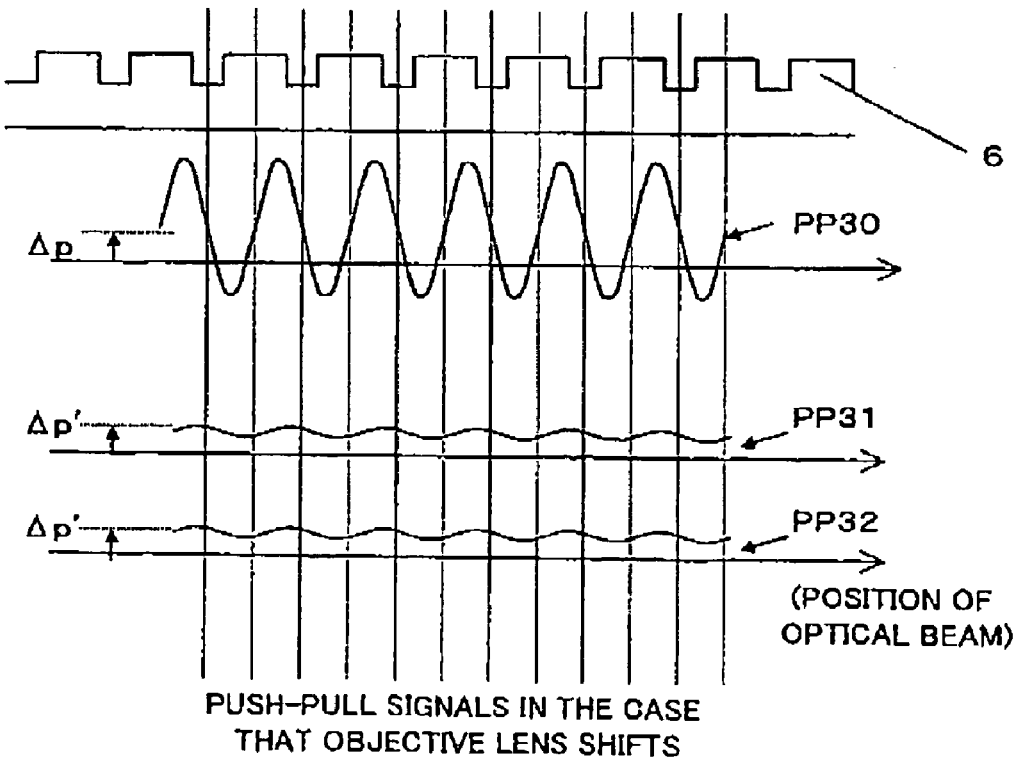
FIG. 34 is an explanatory diagram showing push-pull signals, when an objective lens has shifted in the phase shift DPP method.

The beams condensed on the optical disc 6 with the objective lens 5 form spots with four main peaks, as shown in FIG. 3. Here, as in the conventional example described with reference to FIG. 33, the push-pull signals PP31 and PP32 using the sub beams 31 and 32, respectively, have zero amplitude relative to the push-pull signal PP30 of the main beam with no phase difference.

Figure 4:
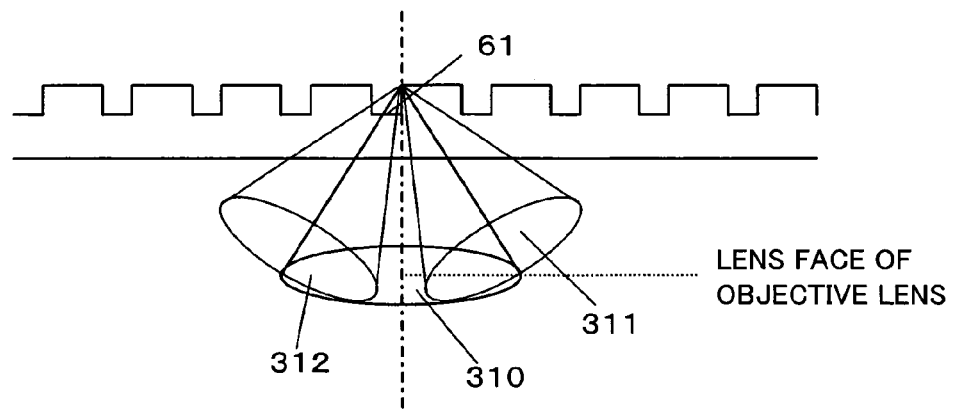
FIG. 4($a$) is a front view showing a diffraction pattern of a reflected beam from an optical disc, and FIG. 4($b$) is a plan view showing the diffraction pattern on a lens face of an objective lens.
Figure 4:
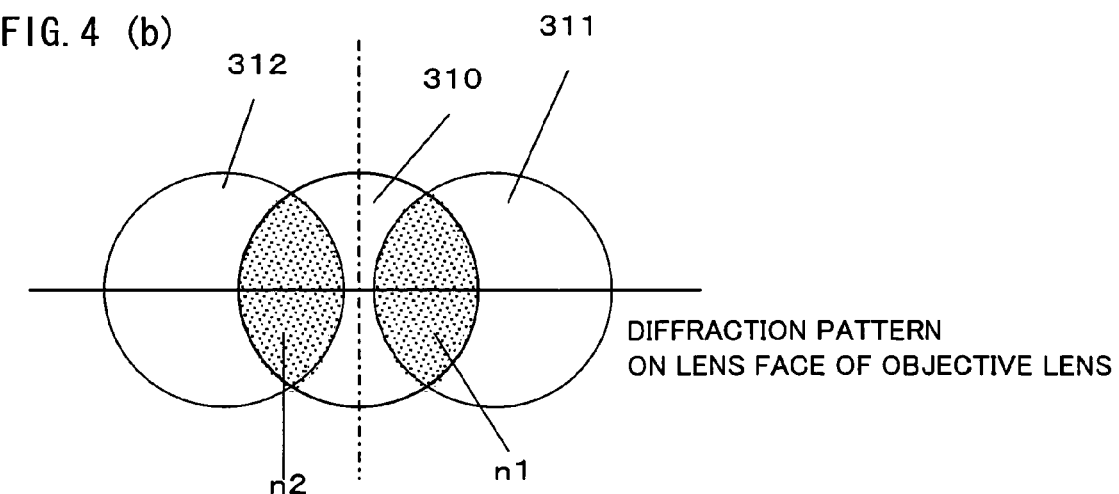

In the following, description is made as to the principle by which the sub beams do not generate push-pull signals (amplitude=0). As shown in FIG. 4(*a*), the optical beam (sub beam 31) condensed on the track 61 of a periodic structure with the objective lens 5 is reflected and separated into diffraction rays of 0 order component 310 and ±1st order components 311 and 312. These diffraction rays interfere in overlapping regions n1 and n2, and form a diffraction pattern (push-pull pattern) on the objective lens, as shown in FIG. 4(*b*).

Figure 5:
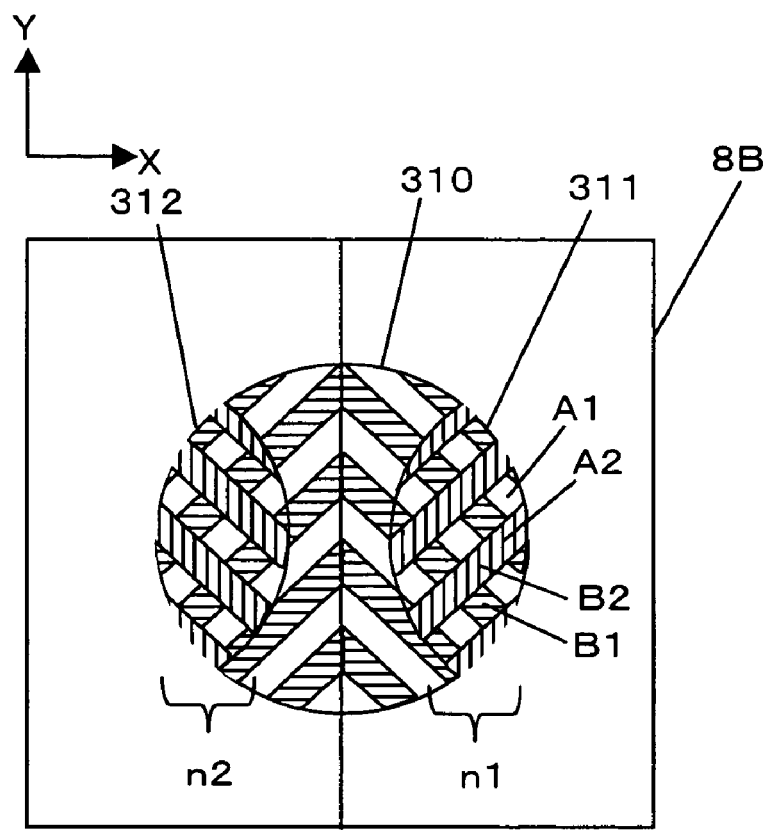
FIG. 5 is an explanatory diagram showing a diffraction pattern of a beam on a detector in accordance with the First Embodiment of the present invention.

FIG. 5 shows a beam that was reflected by the optical disc and incident on the objective lens. When the grating 3 of FIG. 1(*b*) is used, the diffraction rays of the reflected beam have a phase shift of 180 degrees between the hatched portions and non-hatched portions shown in FIG. 5. In the regions n1 and n2 where the ±1st order components 311 and 312 overlap with the 0 order component 310, the regions of phase shift of the respective diffraction rays cross.

For example, the region n1 where the diffraction rays overlap, i.e., the area which becomes either light or dark by the off-track of the beam (push-pull signal region), has four different regions including (i) region A1 which is not affected by the phase shift, (ii) region A2 in which the phase shift regions of 310 and 311 overlap (grid portions of the hatched regions), (iii) region B1 in which only the 0 order component of the diffraction light has a phase shift, and (iv) region B2 in which only the +1st order component of diffraction light has a phase shift. Here, since the 0 order component and the +1st order component both have a phase difference of 180 degrees in the area A2, there is no phase difference between the two relative to one another. Thus, there is an inversion of push-pull difference between (a) the regions B1 and B2 in which the 0 order component 310 and the +1 order component 311 have a 180-degree phase difference, and (b) the regions A1 and A2 in which there is no phase difference.

In the present invention, as shown in FIG. 1(*b*), the phase shift region (for example, the second grating pattern B) is divided and tilted in opposite directions in the first region and second region separated along the y axis, i.e., the track direction of the optical disc. Therefore, in the regions n1 and n2 where light and dark areas of push-pull are generated in the reflected light from the optical disc, the phase shift regions cross and are divided into smaller regions. As a result, the regions A1 and A2 and the regions B1 and B2, where brightness inversion occurs, have substantially equal area. Therefore, when only n1 is considered, the regions in which brightness inversion occurs always become equal in any off-track state, and no push-pull component will be detected in the end even when the whole is added. Therefore, the push-pull component that results from the diffraction on the track always becomes 0 when a differential signal (push-pull signal) is detected by the two-part detector 8B shown in FIG. 5.

Figure 6:
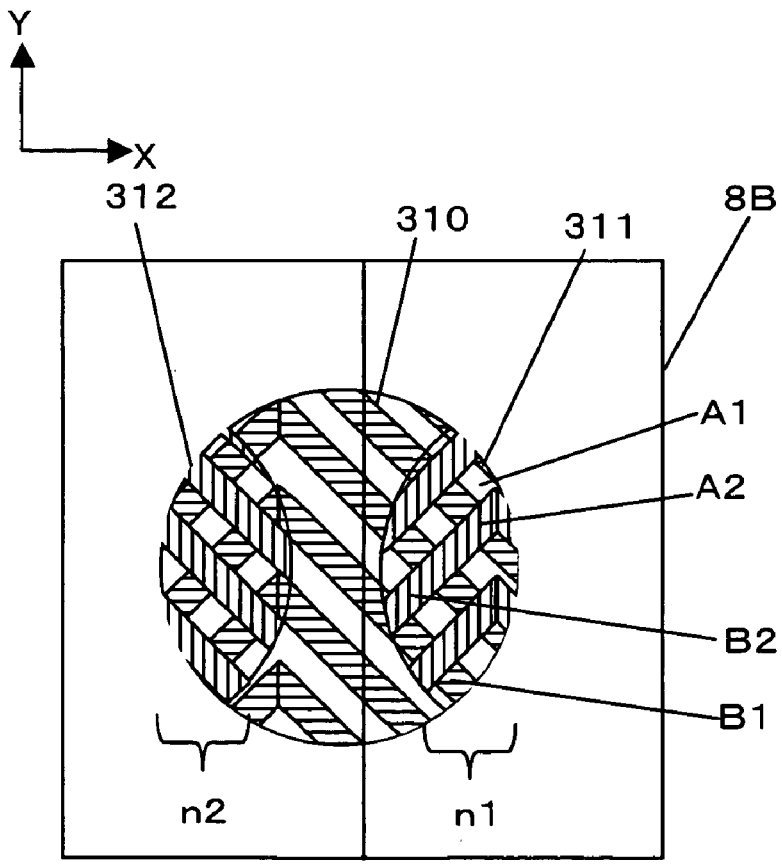
FIG. 6 is an explanatory diagram showing a diffraction pattern of a beam on the detector, when there is a shift in the objective lens.

Moreover, as shown in FIG. 6, when the objective lens shifts in a radial direction by tracking, a relative position to the grating 3 shifts, and the phase shift regions also shift. However, in the regions n1 and n2 where light and dark areas of the push-pull are generated, since the phase shift regions cross as in a state that there is no objective lens shifting, the amplitude of the push-pull signal remains 0 as a whole. Therefore, the characteristics are not impaired by the objective lens shifting, and the shift characteristics improve. The same phenomenon occurs when the grating 3 shifts in the x direction during assembly of the optical pickup. However, in the domain in which the phase shift regions cross, the characteristics are substantially constant and the push-pull amplitude can always be suppressed at 0. Even when the grating 3 shifts in the y direction during assembly of the optical pickup, the characteristics are substantially constant and position adjustment is unnecessary because the phase shift regions are divided into multiple regions.

Moreover, the gist of the present invention is to suppress the overall push-pull amplitude of sub beams at 0 by crossing and overlapping the phase shift regions of the 0 order component 310 and the +1 order component 311, or of the 0 order component 310 and the −1 order component 312 of the diffraction light. In this regard, the number of divisions can be maximized and accordingly the push-pull amplitude can be suppressed effectively when the phase shift regions are tilted to cross each other at an angle of 90 degrees.

Therefore, in providing regions of grating pattern with the direction of patterning tilted in opposite directions symmetrical about the y-axis, i.e., the track direction of the optical disc, the push-pull amplitude can be effectively suppressed when the tilt angles $\theta 1$ and $\theta 2$ (see FIG. 1(*b*)) are respectively set to substantially 45±10 degrees. Note that, it is not necessarily required to form the grating patterns symmetrical about the y-axis. The push-pull amplitude can also be suppressed effectively if the crossed angle is set to substantially 90 degrees by combining the asymmetrical tilt angles of $\theta 1=35$ degrees and $\theta 2=55$ degrees, for example.

Moreover, since the phase shift portions (the phase shift regions) are crossed and overlapped, there is little influence and almost no characteristic change occurs even if the width of the phase shift portion deviates from its designed value, or the phase shift pattern of an emergent beam from the objective lens undergoes a change relative to a change in the lens magnification of the optical system. Therefore, a permissible level of design tolerance or assembly tolerance can be made larger, thereby providing superior mass-productivity and versatility.

Figure 7:
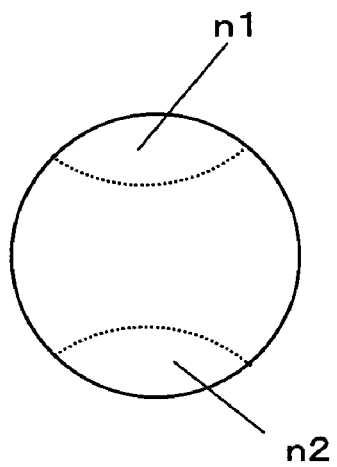
FIG. 7($a$) is an explanatory diagram showing a push-pull pattern of a disc with predetermined specifications, and FIG. 7($b$) is an explanatory diagram showing a push-pull pattern of a disc with different specifications from the one shown in FIG. 7($a$).
Figure 7:
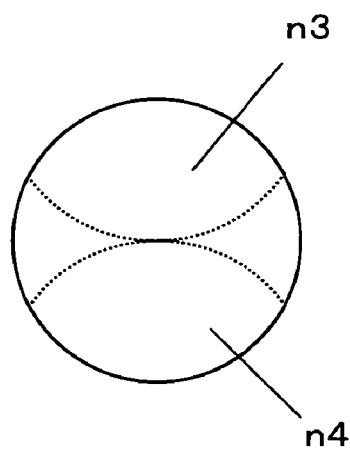

Next, description is made as to the adverse effects caused by a change in push-pull pattern. FIG. 7 is a schematic diagram showing a push-pull pattern. Even if the pickup of the same optical system is used, the diffraction pattern from the disc changes if the groove pitch of the optical disc is different. For example, a push-pull pattern shown in FIG. 7(*a*) is obtained when the pitch of the optical disc is narrow, and a push-pull pattern shown in FIG. 7(*b*) is obtained when the pitch of the optical disc is wide under different specifications. Even with the discs having widely different push-pull patterns as above, the phase shift patterns of the present invention can always provide crossed and overlapping phase shift regions, and thereby suppresses the push-pull amplitude at 0 at all times. Similarly, a push-pull pattern changes when the NA (numerical aperture) of the objective lens is different. Even in this case, the same effect is obtained and push-pull amplitude can always be suppressed.

According to the present embodiment, the amplitudes of the push-pull signals of the sub beams become 0 regardless of the groove depth. That is, since amplitude is 0 in any position on the track, the position adjustment (rotation adjustment of the diffraction grating and so on) of the three beams is unnecessary. Therefore, assembly adjustment of the pickup can be simplified drastically.

Second Embodiment

Figure 8:
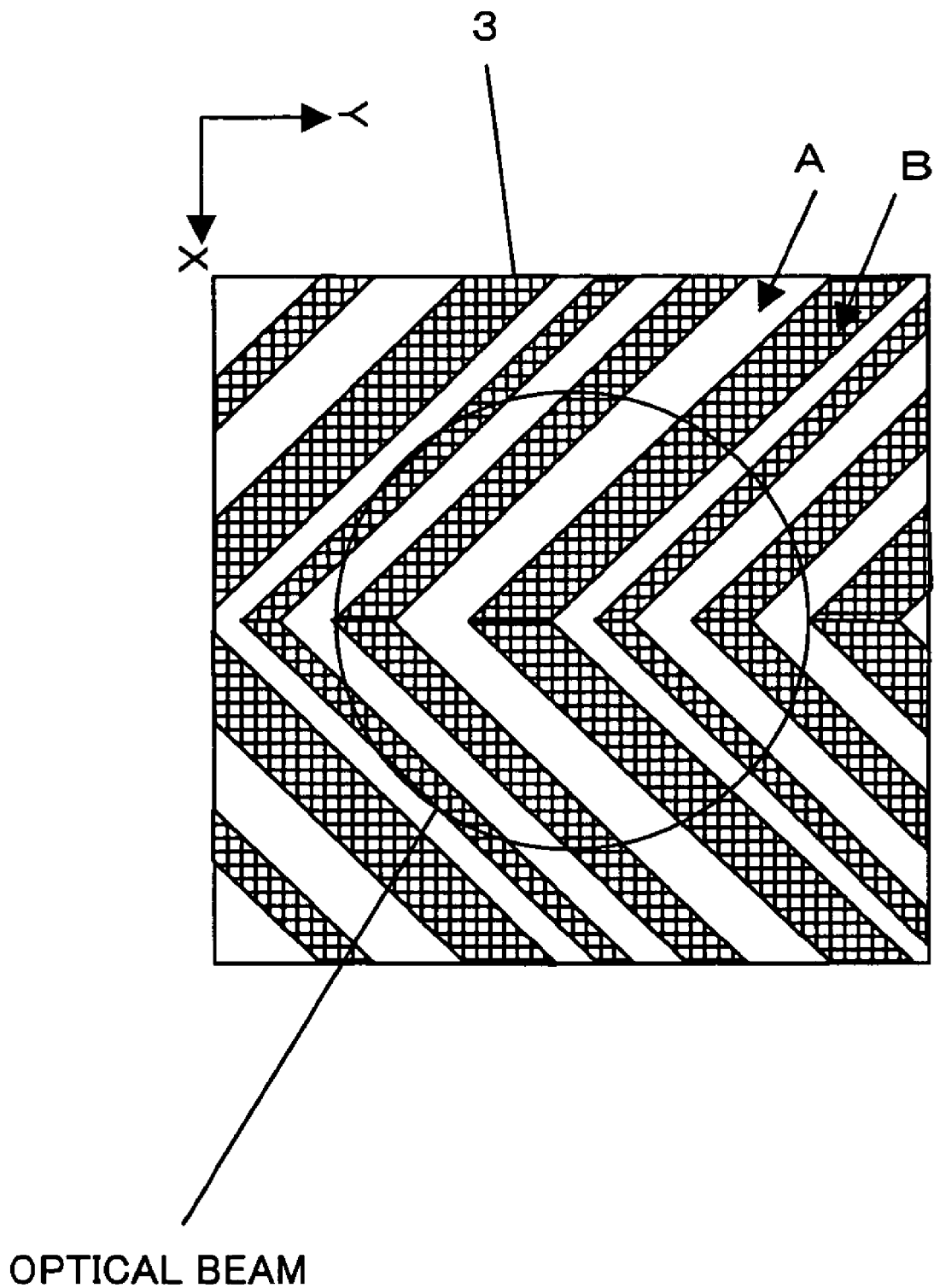
FIG. 8 is an explanatory diagram showing a structure of a diffraction grating in accordance with a Second Embodiment of the present invention.

The Second Embodiment of the present invention is explained below in detail using FIG. 8 through FIG. 12. Although the structure of an optical pickup of the present embodiment is the same as what was shown in the First Embodiment, the present embodiment differs from the foregoing embodiment in the shapes of the first grating pattern A and second grating pattern B. Those grating patterns are shown in FIG. 8. The present embodiment provides a plurality of grating patterns that are tilted in opposite directions in the areas separated by the y-axis. The present embodiment is the same as the First Embodiment in that the first and second grating patterns A and B have a 180-degree phase difference in the periodic structure of raised and recessed portions (groove and land). However, the Second Embodiment differs from the First Embodiment in that the first grating pattern A, which has no phase difference, and the second grating pattern B, which has a phase difference of 180 degrees have widths of irregular intervals.

The Second Embodiment in which the grating patterns are formed at irregular intervals is described below by way of comparison with the First Embodiment in which the grating patterns are formed at regular intervals. Here, description is given through the case where an optical disc with a relatively wide groove pitch is used, and the case where shifting of the objective lens has occurred. The present invention is particularly effective for such cases.

Figure 9:
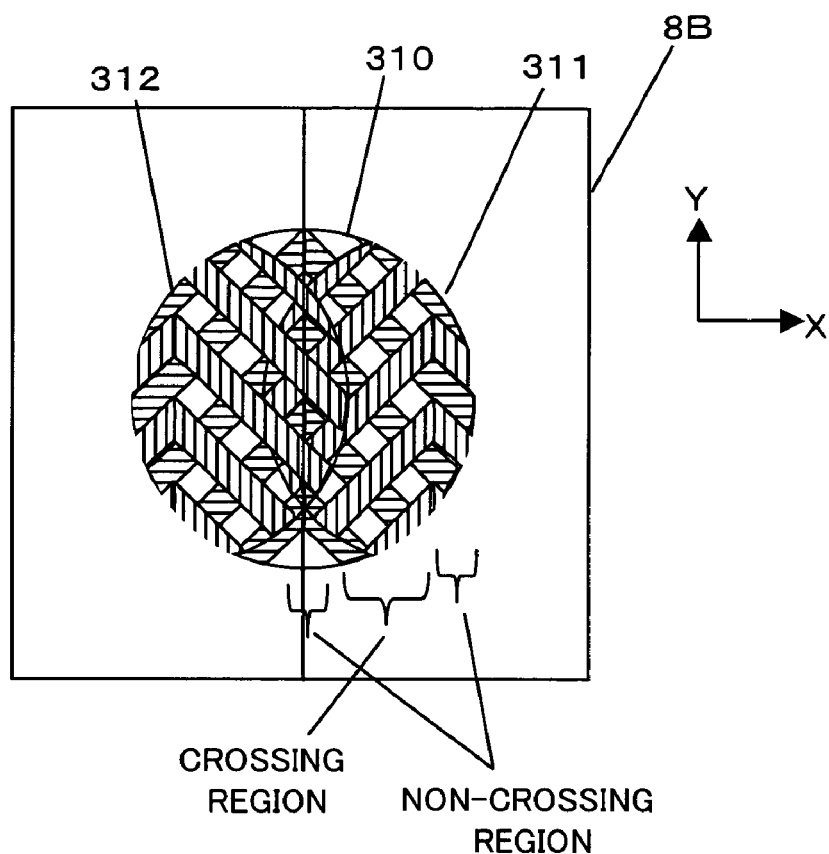
FIG. 9 is an explanatory diagram showing a diffraction pattern of a beam on the detector in accordance with the First Embodiment of the present invention.

First, a problem of using the grating 3 of FIG. 1 described in the First Embodiment is explained. FIG. 9 shows a push-pull pattern of reflected light of an optical disc with relatively wide disc grooves, when the grating 3 of the First Embodiment which forms the grating pattern of regular intervals are used. When an optical disc with relatively large disc grooves is used, n1 and n2 of the push-pull patterns overlap in the center of a beam. In this case, a crossing portion m1 where phase shift regions cross and overlap, and a non-crossing portion m2 where phase shift regions do not cross are generated. The non-crossing portion m2 increases, as shown in FIG. 9, particularly when the objective lens shifts.

Figure 10:
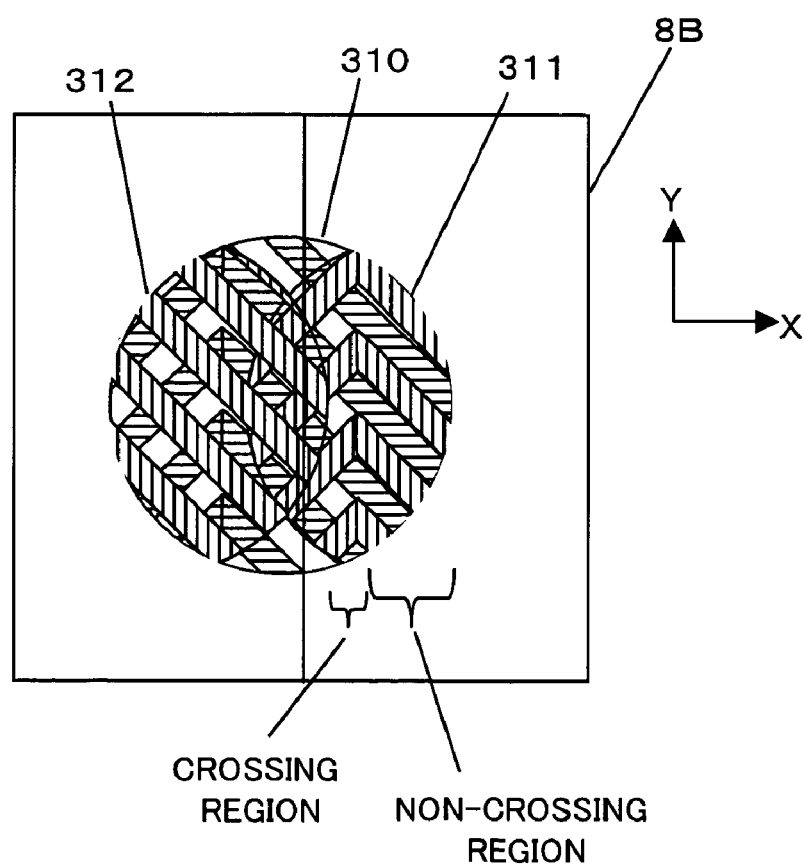
FIG. 10 is an explanatory diagram showing a diffraction pattern of a beam on the detector, when there is a shift in the objective lens.

The non-crossing portion has the following characteristics. As shown in FIGS. 9 and 10, the phase shift portions of the 0 order component 310 and +1 order component 311 of diffraction light do not overlap in the non-crossing portion when, for example, the width of the first and second grating patterns in the track direction, more specifically, the width of the divided phase shift patterns is related to the groove pitch of the optical disc or the magnification of the optical system under certain conditions. When the width of the phase shift patterns is constant, the whole non-crossing portion becomes the regions B1 and B2 described in the First Embodiment. Therefore, in this case, the whole non-crossing portion becomes either light or dark by the push-pull, and the effect of suppressing the push-pull signal amplitude is lost.

Figure 11:
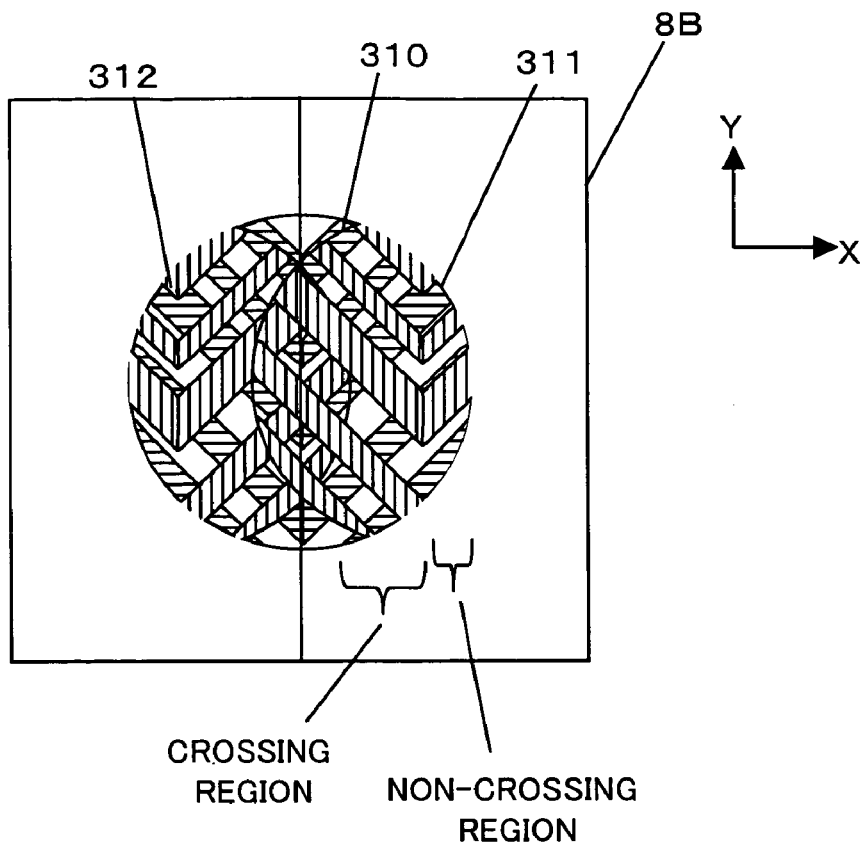
FIG. 11 is an explanatory diagram showing a diffraction pattern of a beam on a detector in accordance with the Second Embodiment of the present invention.

FIG. 11 shows a push-pull pattern adopting the present embodiment in which the grating pattern is formed at irregular intervals. As can be seen from FIG. 11, the non-crossing portion does not have areas of phase shift regions that either do not overlap or completely overlap.

Figure 12:
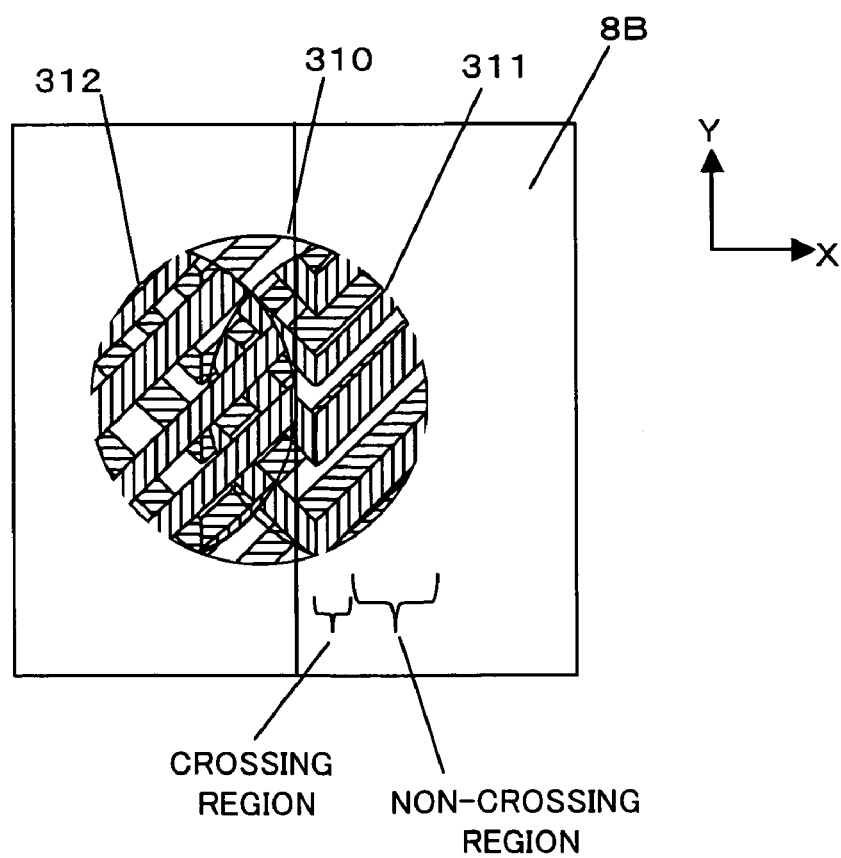
FIG. 12 is an explanatory diagram showing a diffraction pattern of a beam on the detector, when there is a shift in the objective lens.

FIG. 12 illustrates a case where a large objective lens shift has occurred. As can be seen, the influence of the non-crossing portion is small even when the objective lens has shifted largely. Therefore, as compared with the case where the grating patterns are formed at regular intervals, the push-pull brightness can always be suppressed, thereby suppressing the amplitude of the push-pull signal even when an objective lens shift occurs.

Therefore, the effect of suppressing the push-pull amplitudes of the sub beams is enhanced and the characteristics of phase shift DPP improves even when there is a large shift of the objective lens or grating, or when an optical disc with a considerably wide groove pitch is used.

Third Embodiment

The Third Embodiment of the present invention is described below using FIG. 13 through FIG. 15. An optical pickup of the present embodiment has the same structure as what is shown in FIG. 1, but differs there from in the structure of groove portion of the grating 3.

The Second Embodiment already described problems of the grating 3 shown in FIG. 1 and described in the First Embodiment. Accordingly, no further explanation will be given. The present embodiment describes another method of improving characteristics of the "non-crossing portion" in which the phase shift regions do not cross. As described in the Second Embodiment, the "non-crossing portion" poses problems when the groove pitch of an optical disc is wide, or when an objective lens shift is large.

Figure 13:
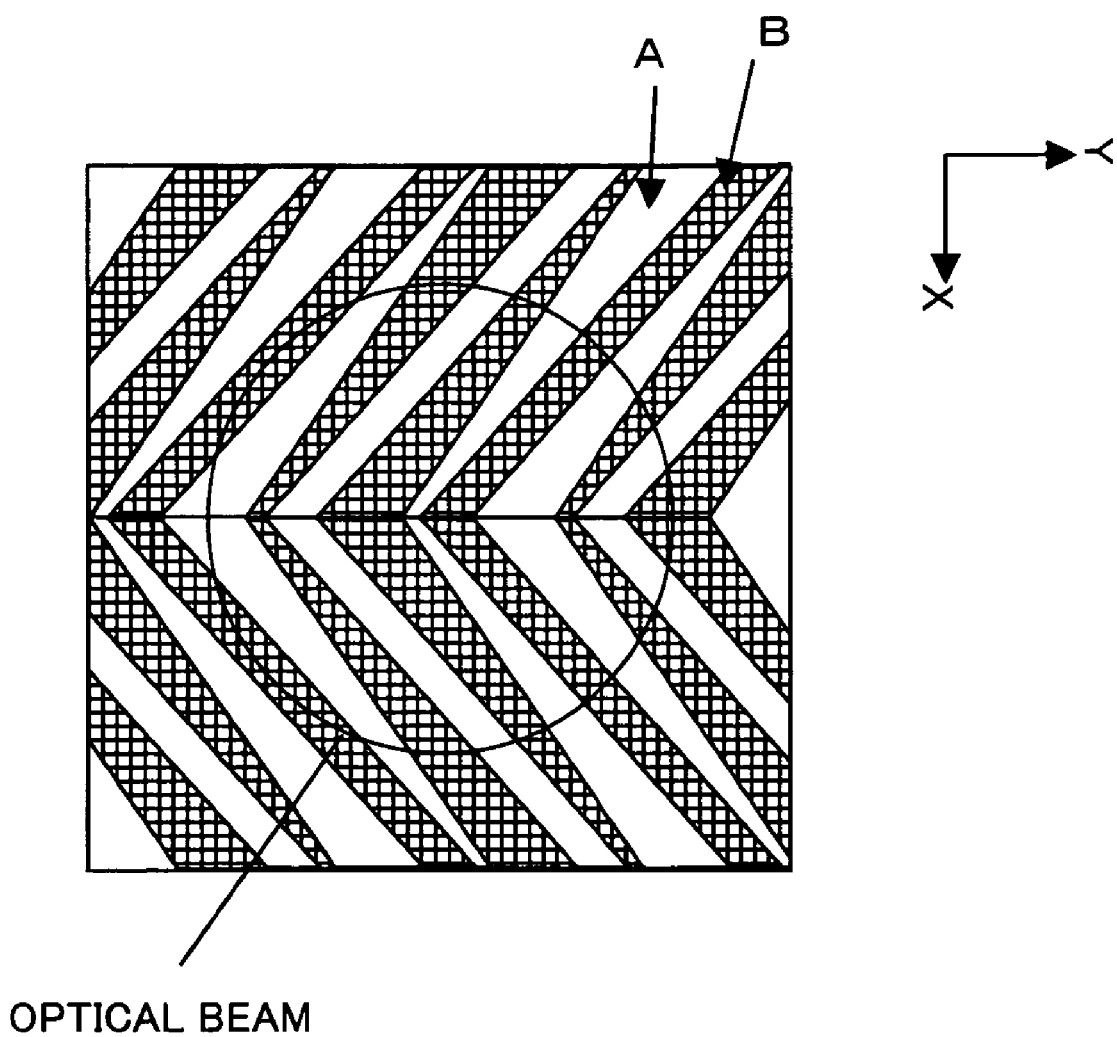
FIG. 13 is an explanatory diagram showing a structure of a diffraction grating in accordance with a Third Embodiment of the present invention.

Another grating pattern of the grating 3 is shown in FIG. 13. In this grating 3, a plurality of grating patterns are provided that are tilted in opposite directions in areas separated by the y-axis (border), and the periodic structure of alternating grooves has a 180-degree phase difference. This is the same as that described in the First and Second Embodiments. However, the present embodiment differs from the foregoing embodiments in that the width of the grating patterns, parallel to the track of an optical recording medium, varies continuously as the grating patterns extend from the y-axis (border) to the periphery. Thus, by varying the width of the grating patterns continuously, the non-crossing portion will not have areas of phase shift regions that either do not overlap at all or completely overlap, as in the Second Embodiment.

Therefore, the effect of suppressing the push-pull amplitudes of the sub beams is enhanced and the characteristics of phase shift DPP improves even when there is a large shift of the objective lens or grating, or when an optical disc with a considerably wide groove pitch is used.

Figure 14:
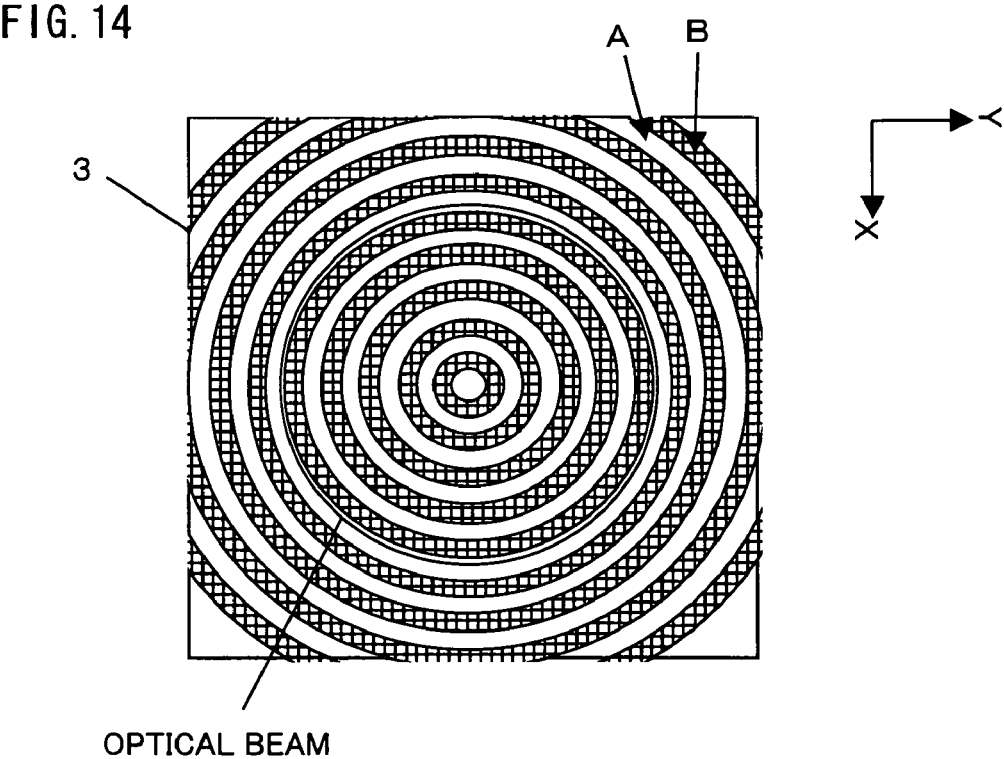
FIG. 14 is an explanatory diagram showing a structure of another diffraction grating in accordance with the Third Embodiment of the present invention.
Figure 15:
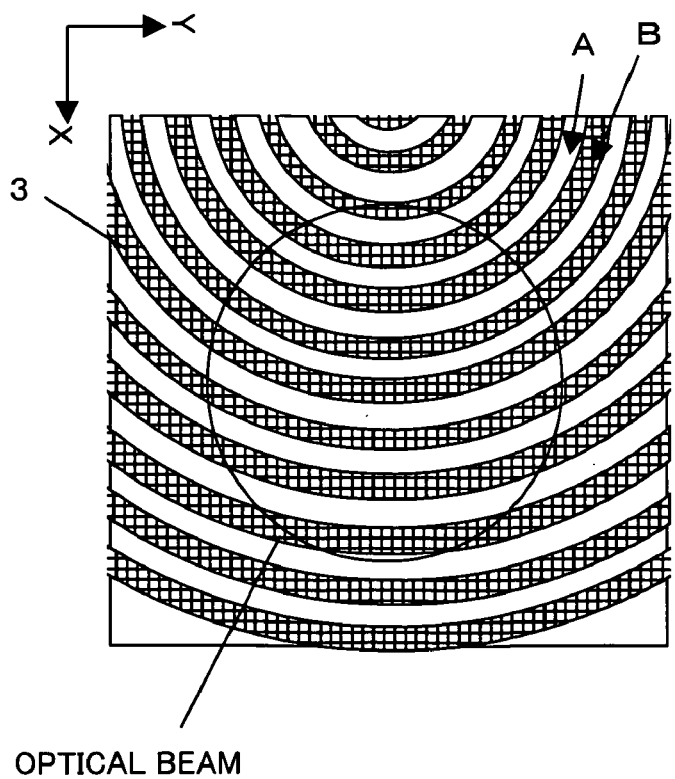
FIG. 15 is an explanatory diagram showing a structure of still another diffraction grating in accordance with the Third Embodiment of the present invention.

Furthermore, for the same purpose, a phase shift pattern with alternating phase differences may be formed by dividing it in the shape of a concentric circle as shown in FIG. 14 or in the shape of a curve as shown in FIG. 15. In this case, completely the same effect can be obtained.

Moreover, in the First through Third Embodiments, the grating pattern is formed almost symmetrically by being divided at the border parallel to the track direction of an optical recording medium. However, as is clear from the principle that described the reason the push-pull signals of the sub beams are not generated, and the principle that described differences in the push-pull patterns, the effect of the present invention remains the same as long as the first grating pattern A and the second grating pattern B are always overlapped in the push-pull pattern by tilting the grating patterns. Especially, when the grating patterns described in the Second and Third Embodiment are used, it is easy to understand that the effect of suppressing the push-pull amplitudes of the sub beams can be obtained even when the grating pattern is not substantially symmetrical about the border parallel to the track direction of an optical recording medium. Note that, the patterns described here are merely examples and do not limit a structure of the present invention in any ways.

Fourth Embodiment

The Fourth Embodiment of the present invention is explained using FIG. 16 through FIG. 21. An optical pickup of the present embodiment has the same structure as what is shown in FIG. 1, but differs there from in the structure of the groove portion of the grating 3. When the grating 3 shown in FIG. 1(b) and described in the First Embodiment is used, the beams condensed on the optical disc 6 with the objective lens 5 form beam spots with four main peaks, as shown in FIG. 3. When the first grating pattern A and the second grating pattern B are inclined by 45 degrees relative to the border line in the direction of y-axis, the four peaks are generated in positions substantially corresponding to four vertices of a square. Note that, the effect of suppressing the push-pull amplitudes of the sub beams can be maximized at the tilt angle of 45 degrees. The following problems are caused when this is applied to a recordable optical disc.

Figure 16:
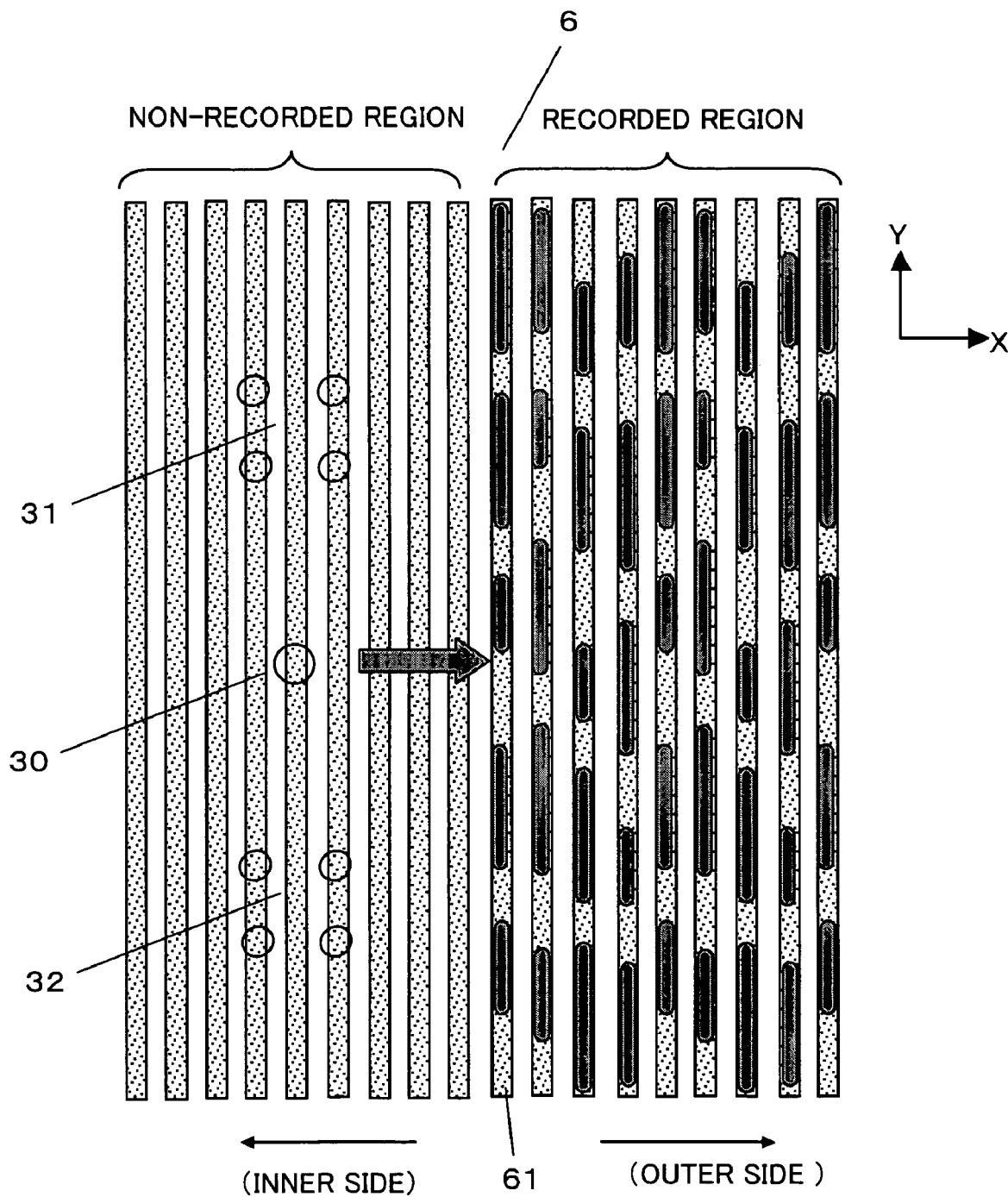
FIG. 16 is an explanatory diagram showing shapes of beam spots on an optical disc that has an unrecorded region and an recorded region, when the optical pickup in accordance with the First Embodiment of the present invention is used.

When using a phase change disc or a write-once disc, a track portion has different reflectivities in a non-recorded region and a recorded region as a result of a change in reflectivity of the recording pits. For example, as shown in FIG. 16, the following considers a case where the optical beam moves (access is made) from an inner side toward an outer side of an optical disc, where an area on the outer side of the optical disc (positive direction on x-axis) with respect to a track 61 is a recorded area, and the inner side thereof (negative direction on x-axis) is a non-recorded area.

Figure 17:
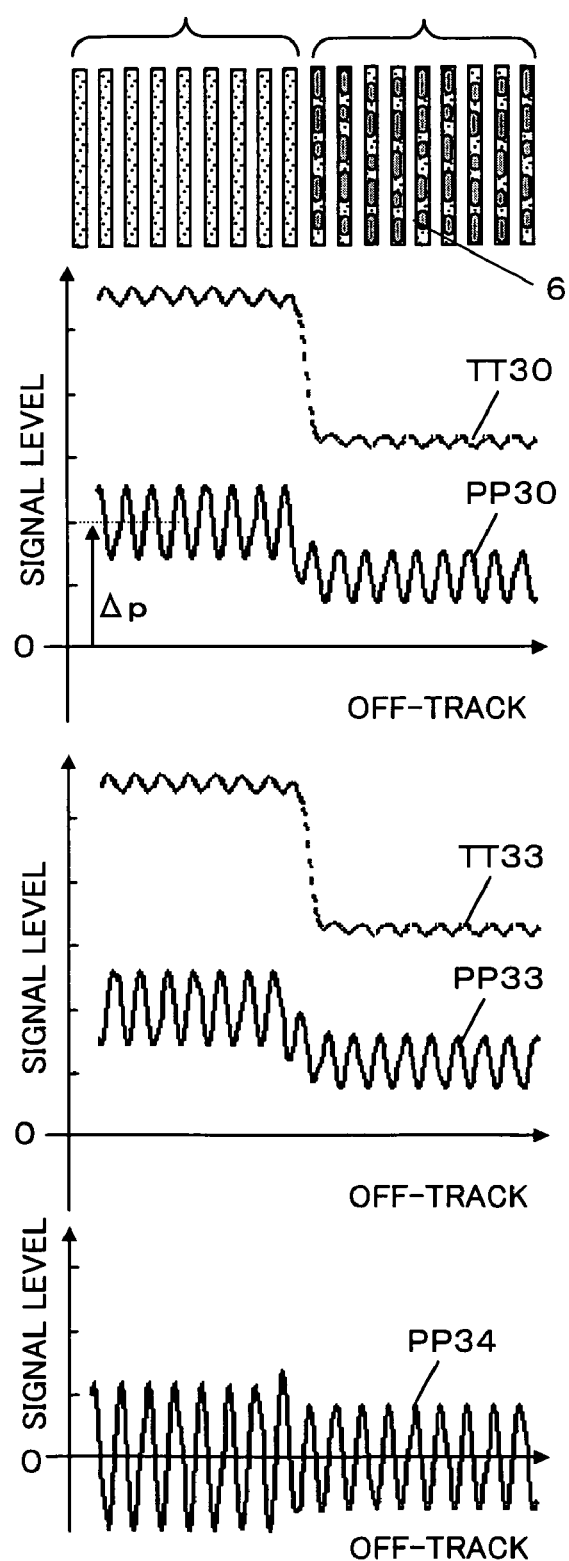
FIG. 17 is an explanatory diagram showing push-pull signals etc., in the case that an objective lens has shifted in a conventional DPP method.
Figure 18:
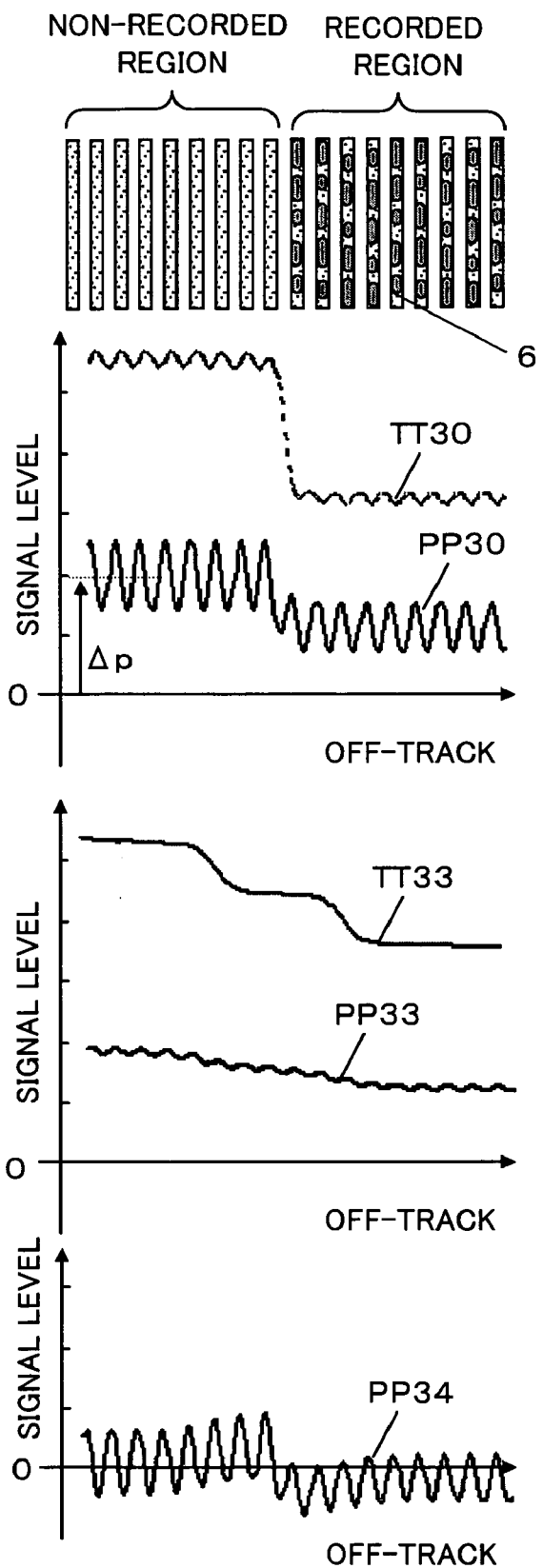
FIG. 18 is an explanatory diagram showing push-pull signals etc., in the case that the objective lens has shifted in the optical pickup in accordance with the First Embodiment of the present invention.

The following deals with push-pull signal waveforms obtained when there is a large shift of the objective lens and a large offset amount $\Delta p$ of a push-pull signal PP30 of the main beam. FIG. 17 shows changes in (i) the push-pull signal PP30 of the main beam 30, (ii) a sum signal PP33 (=k(PP31+PP32)) of push-pull signals PP31 and PP32 of the sub beams 31 and 32, (iii) a total light quantity signal TT30 of the main beam 30, (iv) a total light quantity signal TT33 of the sub beams 31 and 32, and (v) a differential push-pull signal PP34 (PP30−PP33), when a conventional grating without a phase shift was used. FIG. 18 shows changes in the respective push-pull signals and total light quantity signals when the grating 3 with a phase shift shown in FIG. 1 was used.

In FIG. 17, when the optical beam moves to the recorded area from the non-recorded area, the push-pull signal PP30 of the main beam changes its amplitude as a result of the change in reflectivity. In addition, a DC offset amount is also changed. The push-pull signal PP33 of the sub beams also shows substantially the same change, and therefore a DC offset can be corrected almost completely in the differential push-pull signal PP34, which is obtained by subtracting PP33 from PP30, even though an amplitude drop by the reflectivity change still occurs.

In FIG. 18, the push-pull signal PP30 of the main beam behaves the same way as in FIG. 17 when the optical beam moves to the recorded area from the non-recorded area. However, as for the push-pull signal PP33 of the sub beams, a DC offset changes differently from that of the push-pull signal PP30 of the main beam, although the push-pull signal amplitude generated by track crossing is suppressed at substantially 0. As a result, in addition to the amplitude drop caused by changes in reflectivity, a DC offset is caused in the differential push-pull signal P34 (PP30−PP33) in the vicinity of the border of the non-recorded and the recorded area.

This is because the beam intensity of the sub beam spots condensed on the optical disc 6 spread as a whole as shown in FIG. 3 and FIG. 16, causing the sub beams to be affected by the change in reflectivity more slowly than the main beam is across the border between the non-recorded and the recorded area. The DC offset varies depending on the shape of the groove on the optical disc, or changes in reflectivity of the recording medium. The DC offset is small enough and negligible in some media, but is large in others and needs to be corrected.

Figure 19:
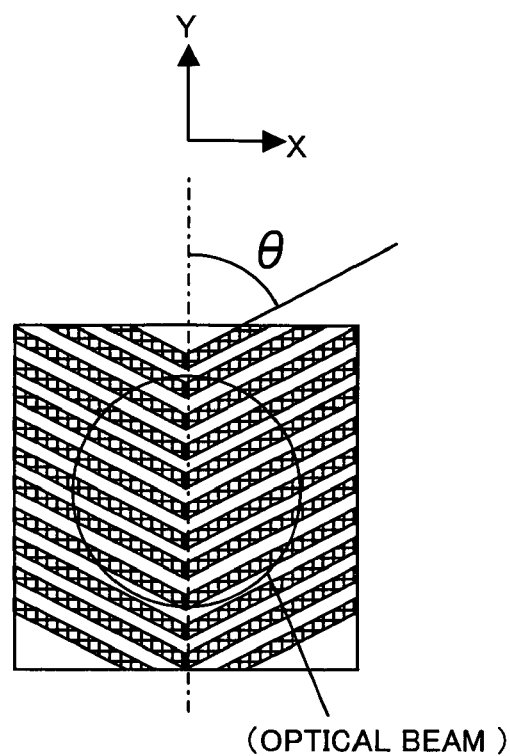
FIG. 19 is an explanatory diagram showing a structure of a diffraction grating in accordance with a Fourth Embodiment of the present invention.

Even when a grating with a phase shift is used, it should be designed such that the beam intensity of the spot condensed on the optical disc 6 does not expand in the radial direction. In this way, the amount of DC offset can be reduced. FIG. 19 illustrates a grating 3 of the present embodiment that is designed this way.

Figure 20:
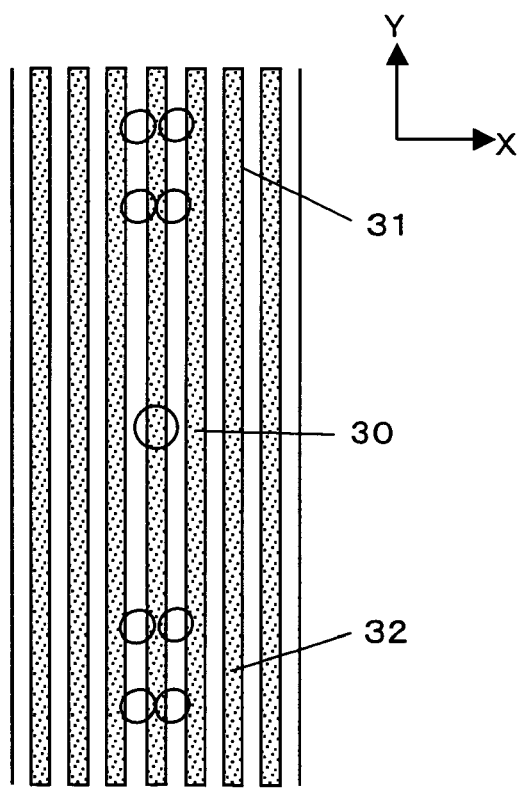
FIG. 20 is an explanatory diagram showing shapes of beam spots on an optical disc, when the optical pickup in accordance with the Fourth Embodiment of the present invention is used.

The grating pattern of this grating 3 is basically the same as the grating pattern shown in FIG. 1, but a tilt angle θ of 65 degrees is set for the plurality of grating patterns that are tilted in opposite directions symmetrically about the y-axis, i.e., the track direction of the optical disc. In this case, the spots condensed on the optical disc 6 have the shape as shown in FIG. 20, in which the four peaks of the sub beam approaches one another in the radial direction (x direction).

Figure 21:
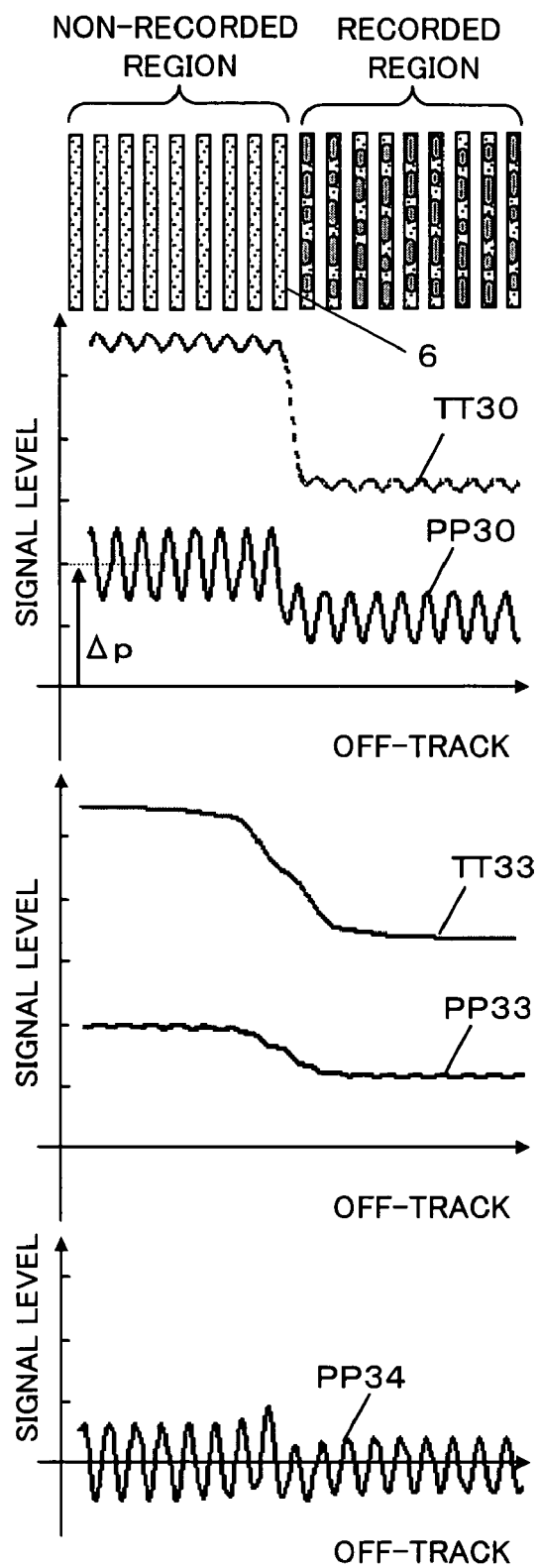
FIG. 21 is an explanatory diagram showing push-pull signals etc., in case that the objective lens has shifted in the optical pickup in accordance with the Fourth Embodiment of the present invention.

FIG. 21 shows the respective push-pull signals using the grating 3. In the push-pull signal PP33 of the sub beams, the DC offset that occurs at the border between the recorded area and the non-recorded area changes more steeply than in FIG. 18, becoming more similar to the change of the push-pull signal PP30 of the main beam 30. Therefore, a DC offset in the differential push-pull signal PP34 (PP30–PP33) can be corrected almost completely, although an amplitude drop is still caused by the reflectivity change.

Since the intensity distribution of the sub beams on the optical disc 6 becomes small as a whole in the radial direction when the tilt angle is increased above 45 degrees, the DC offset also becomes small. Conversely, as the tilt angle approaches 90 degrees, the effect of suppressing the push-pull amplitudes of the sub beams becomes weak and the amplitude is increased. This is not desirable in terms of preserving the intended advantage of not requiring the rotation adjustment for the three beams. With a tilt angle in a range of 55 to 75 degrees, the effect of suppressing the push-pull amplitudes of the sub beams and the effect of reducing the DC offset that occurs in the vicinity of the border of the non-recorded and the recorded area can be obtained at the same time.

Fifth Embodiment

Figure 22:
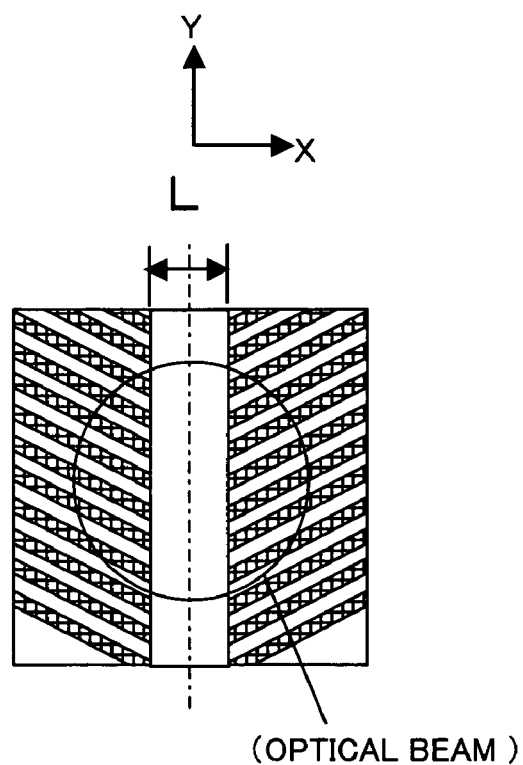
FIG. 22 is an explanatory diagram showing a structure of a diffraction grating in accordance with a Fifth Embodiment of the present invention.

The Fifth Embodiment of the present invention is explained with reference to FIG. 22 and FIG. 23. An optical pickup of the present embodiment has the same structure as what is shown in FIG. 1, but differs there from in the structure of the groove portion of the grating 3. FIG. 22 shows another form of the phase shift grating used to reduce the DC offset that occurs in the non-recorded area and recorded area as explained in the Fourth Embodiment.

Unlike the grating pattern shown in FIG. 1, the grating 3 of the present embodiment in its central portion along the radial direction is not divided into regions of first grating pattern A and second grating pattern B whose alternating grooves and lands are shift from each other. However, the grating 3 does include grooves and lands as a diffraction grating, perpendicular to the track direction, for dividing the light beam into the main beam 30 and the sub beams 31 and 32. This region is defined as a third grating pattern. The pitch of the grooves and lands of the third grating pattern should preferably be the same as the pitch of the first and second grating patterns, and the grooves and lands should preferably correspond in position to the first or second grating pattern.

Figure 23:
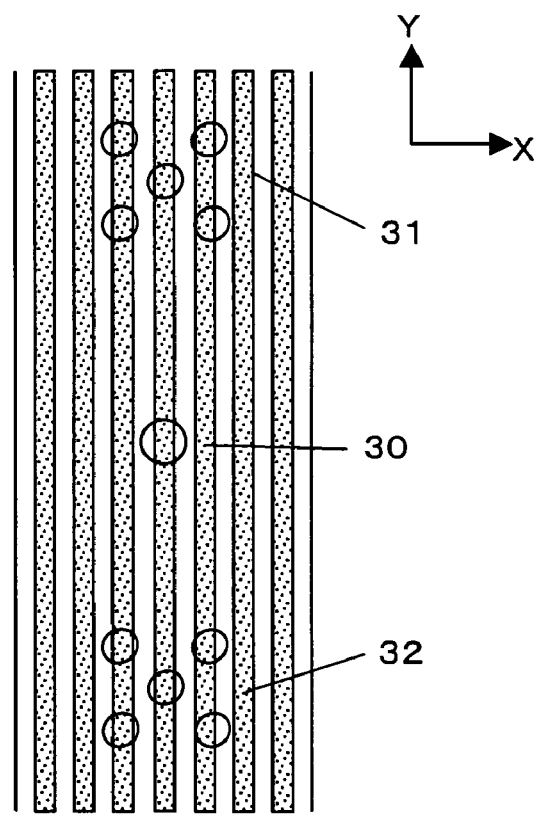
FIG. 23 is an explanatory diagram showing shapes of beam spots on an optical disc, when the optical pickup in accordance with the Fifth Embodiment of the present invention is used.

In this case, the spots condensed on the optical disc 6 have the shape as shown in FIG. 23. As for the sub beams 31 and 32, an intensity peak is generated in the center of the four peaks. These beams produce push-pull signals as shown in FIG. 21 and as described in the Fourth Embodiment. Therefore, a DC offset can be corrected almost completely in the differential push-pull signal PP34 that is obtained by subtracting the push-pull signal P33 of the sub beams from the push-pull signal PP30 of the main beam, although an amplitude drop is still caused by the reflectivity change.

Since the intensity in the central portion of the sub beam on the optical disc 6 becomes large as the width of the third grating region in the radial direction is increased, the DC offset becomes small. However, conversely, the effect of suppressing the push-pull amplitudes of the sub beams becomes weak. This is not preferable in terms of preserving the intended advantage of not requiring the rotation adjustment for the three beams. When the central portion of the sub beam on the optical disk 6 is within a range of about 10% to about 60% of the diameter of the incident optical beam on the grating, the effect of suppressing the push-pull amplitudes of the sub beams and the effect of reducing the DC offset in the vicinity of the border across the non-recorded and the recorded area can be obtained at the same time.

Here, as shown in FIG. 22, the first and second grating patterns are respectively formed in areas separated by a distance L parallel to the track, being swept by edge portions of the optical beam. However, the present invention is not restricted to this, and a grating pattern may be formed that adds a phase shift except a central portion of the area swept by the optical beam. For example, the grating pattern is not necessary required to be divided parallel to the track, and the same effect can be obtained when the grating pattern is in the form of a circle or rectangle. That is, with a structure that enables an intensity peak to be generated in the central portion of the divided sub beam, the problem of amplitude drop caused by reflectivity change and the problem of DC offset can effectively be solved at the same time. Furthermore, the same effect can be obtained when the present embodiment is combined with the Second through Fourth Embodiments.

Sixth Embodiment

Figure 24:
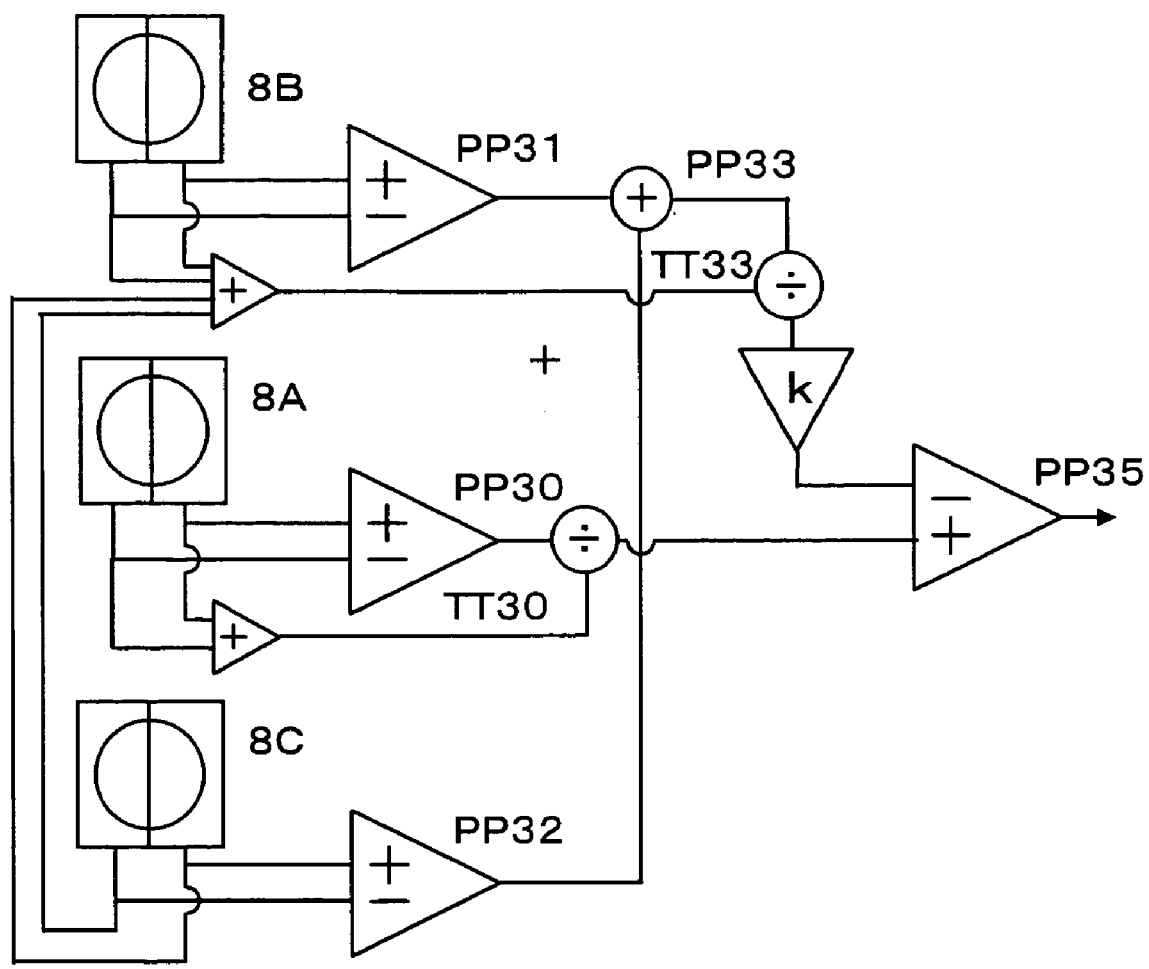
FIG. 24 is an explanatory diagram showing a structure of a detection system of an optical pickup in accordance with a Sixth Embodiment of the present invention.

The Sixth Embodiment of the present invention is explained below in detail with reference to FIG. 24, FIG. 25, and FIG. 26. An optical pickup of the present embodiment has the same structure as what is shown in FIG. 1. However, a feature of the optical pickup of the present embodiment resides in the modification of the calculating method of push-pull signals of the respective beams, which was made in order to reduce the DC offset generated at the border portion of the non-recorded area and recorded area as explained in the Fourth Embodiment.

Referring to FIGS. 17 and 18 described in the Fourth Embodiment, a comparison is made between the total light quantity signals TT30 and TT33. As described in the Fourth Embodiment, comparing the conventional grating (described with reference to FIG. 17) and the grating 3 with a phase shift shown in FIG. 1 (described with reference to FIG. 18), the latter generates a DC offset in the differential push-pull signal PP34, which is obtained by subtracting the push-pull signal PP33 of the sub beams from the push-pull signal PP30 of the main beam, when the optical beam is in the vicinity of the border portion of the non-recorded area and the recorded area in moving from the non-recorded area to the recorded area. Using the grating 3 with a phase shift shown in FIG. 1 generates a DC offset because a DC offset in the push-pull signal PP33 of the sub beams changes differently from that of the push-pull signal PP30 of the main beam, even though a push-pull signal amplitude generated in the push-pull signal PP33 by track crossing is suppressed at substantially 0.

Comparing FIG. 17 and FIG. 18 with respect to the total light quantity signal TT33, it can be seen that the total light quantity signal TT33 varies more gradually when the grating 3 with a phase change as shown in FIG. 1 (described in FIG. 18) is used, as compared with the conventional grating without a phase shift (described in FIG. 17). Here, as shown in FIG. 24, a differential push-pull signal PP35 is calculated as below.

PP35=PP30/TT30−k (PP33/TT33)

That is, the push-pull signals of the main beam 30 and the sub beams are first divided by their respective total light quantity signals TT30 and TT33 and normalized. By subtraction, the DC offset can be greatly reduced.

Figure 25:
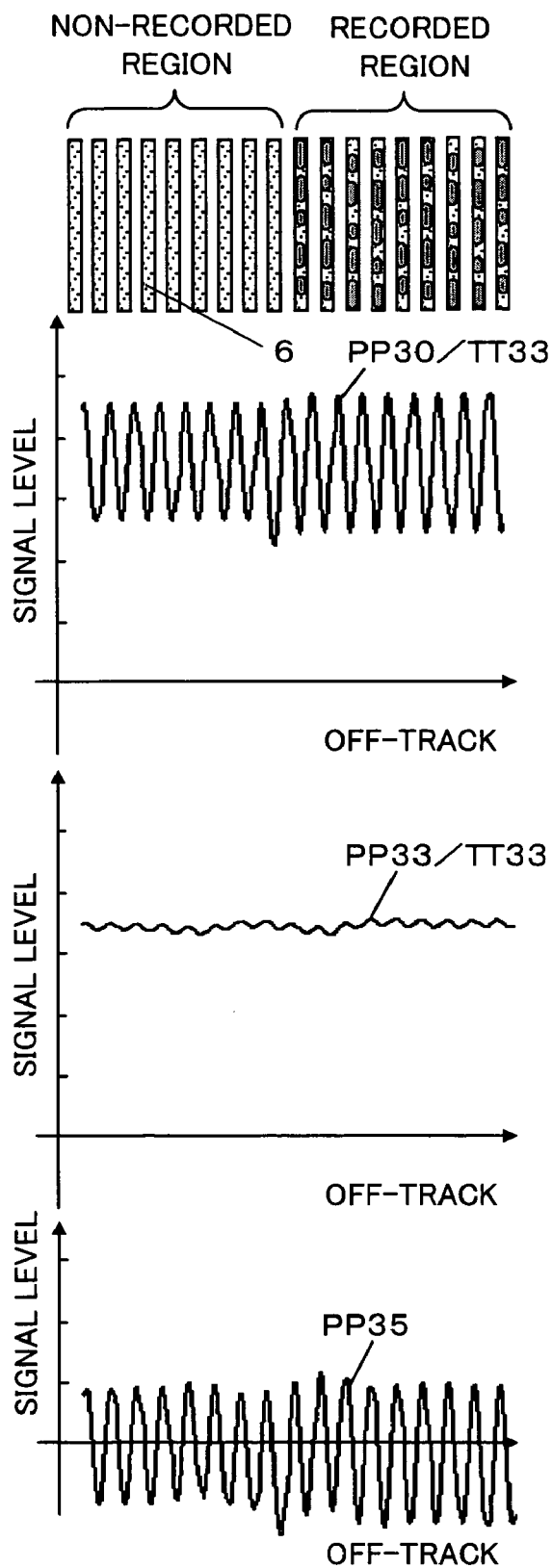
FIG. 25 is an explanatory diagram showing push-pull signals etc., in the case that the objective lens has shifted in the optical pickup in accordance with the Sixth Embodiment of the present invention.
Figure 26:
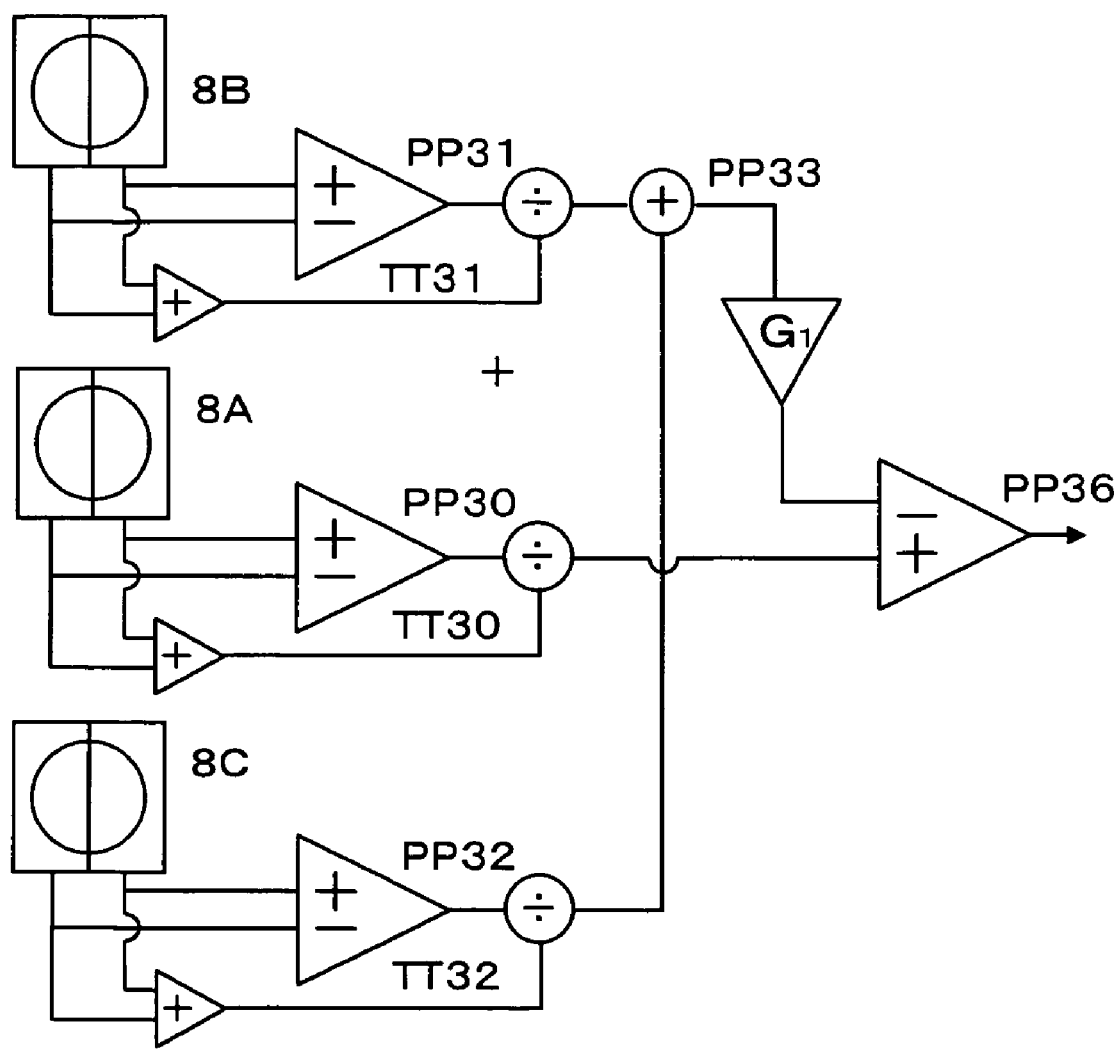
FIG. 26 is an explanatory diagram showing a structure of another detection system of the optical pickup in accordance with the Sixth Embodiment of the present invention.

FIG. 25 shows normalized push-pull signals PP30/TT30, PP33/TT33 and PP35 obtained when the grating 3 with a phase shift shown in FIG. 1 was used. As can be seen, a DC offset is greatly reduced compared with the differential push-pull signal PP34 shown in FIG. 18.

The same effect can be obtained with a differential push-pull signal PP36. As shown in FIG. 26, the differential push-pull signal PP36 is calculated as below by individually normalizing the push-pull signals of the respective sub beams before subtracted from the push-pull signal of the main beam.

PP36=PP30/TT30−k (PP31/TT31+PP32/TT32)

The calculation by way of normalization is not the only way to achieve the described effect. Evidently, the same effect can also be obtained by AGC (Auto Gain Control), which carries out a feedback process to obtain constant values the light quantity.

Seventh Embodiment

The Seventh Embodiment of the present invention is explained below in detail with reference to FIG. 27 through FIG. 30. Here, description will be given through the case where an optical pickup device is applied to a semiconductor laser (light source), a three-beam grating, and a hologram laser unit which integrates a servo-signal generating hologram and a photo detector.

Figure 27:
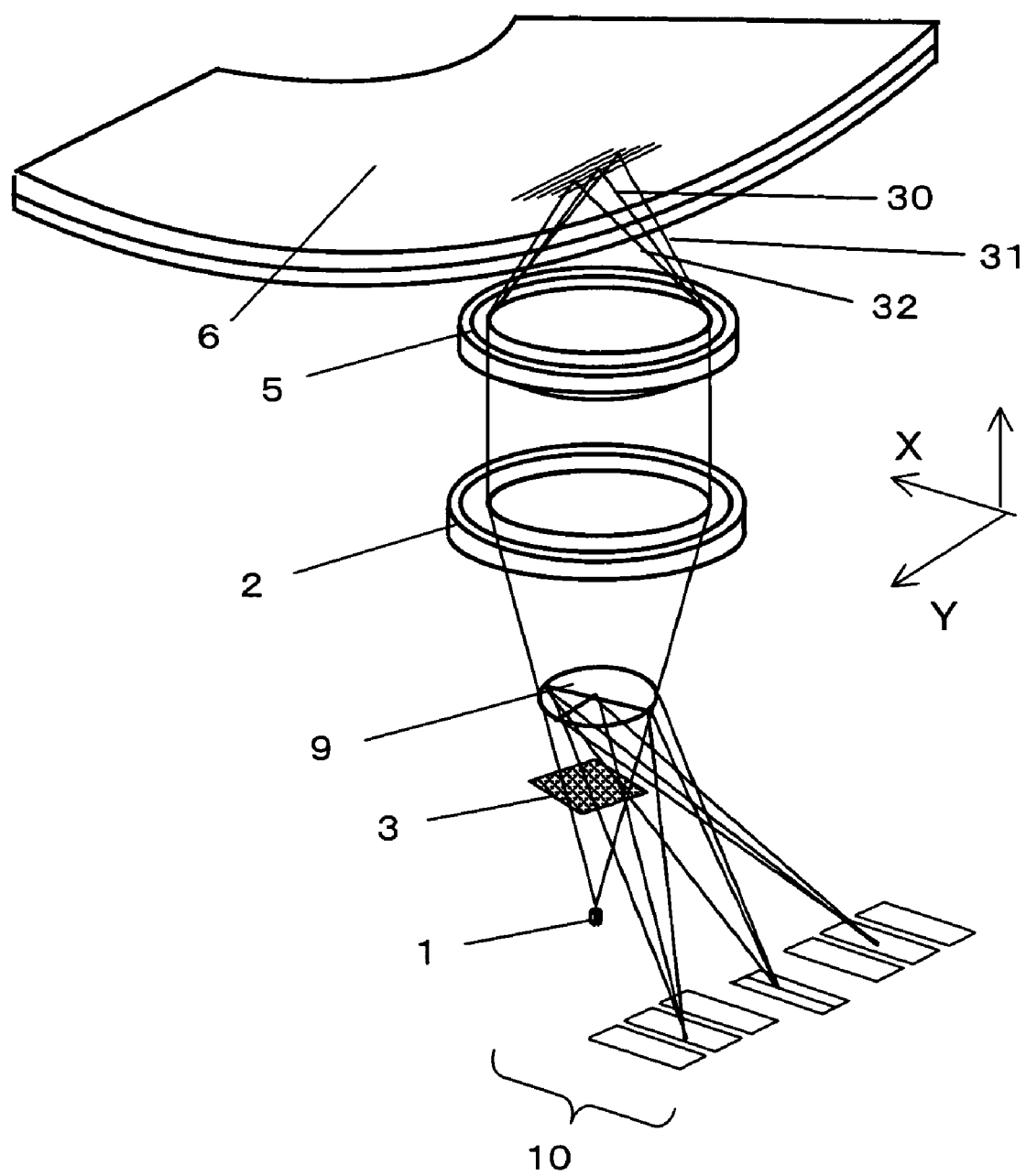
FIG. 27 is a schematic diagram showing a structure of an optical system of an optical pickup in accordance with a Seventh Embodiment of the present invention.

As shown in FIG. 27, the light emitted by a semiconductor laser 1 is divided into three beams (a main beam and ±1st order sub beams) as it passes through the grating 3. A 0 order component of diffraction light produced by a hologram element 9 is condensed on an optical disc 6 through a collimator lens 2 and an objective lens 5. The light reflects back into the hologram element 9 and diffracted into the photo detector.

Figure 28:
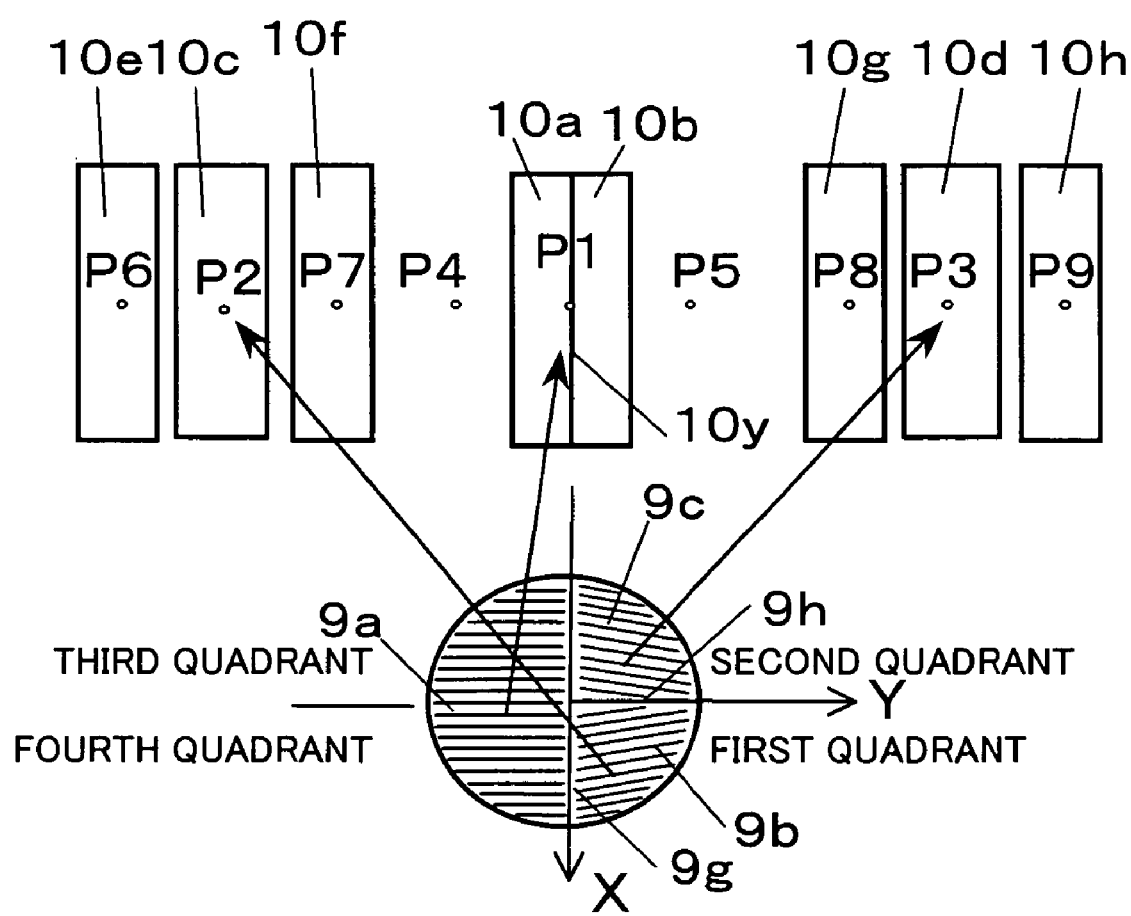
FIG. 28 is an explanatory diagram showing structures of a hologram and an optical detector in a hologram laser pickup in accordance with the Seventh Embodiment of the present invention.

Here, as shown in FIG. 28, the hologram element 9 is divided into three division areas 9a, 9b, and 9c by a dividing line 9g that extends in an x direction corresponding to the radial direction of the optical disc 6, and by a dividing line 9h that extends in a y direction from the center of the dividing line 9g at right angle to the radial direction of the optical disc 6, i.e., in the track direction of the optical disc 6. A grating is formed for each of the division areas 9a, 9b, and 9c.

A light receiving element 10 includes focusing two-part light-receiving-regions 10a and 10b, and tracking light-receiving-regions 10c, 10d, 10e, 10f, 10g, and 10h.

Figure 29:
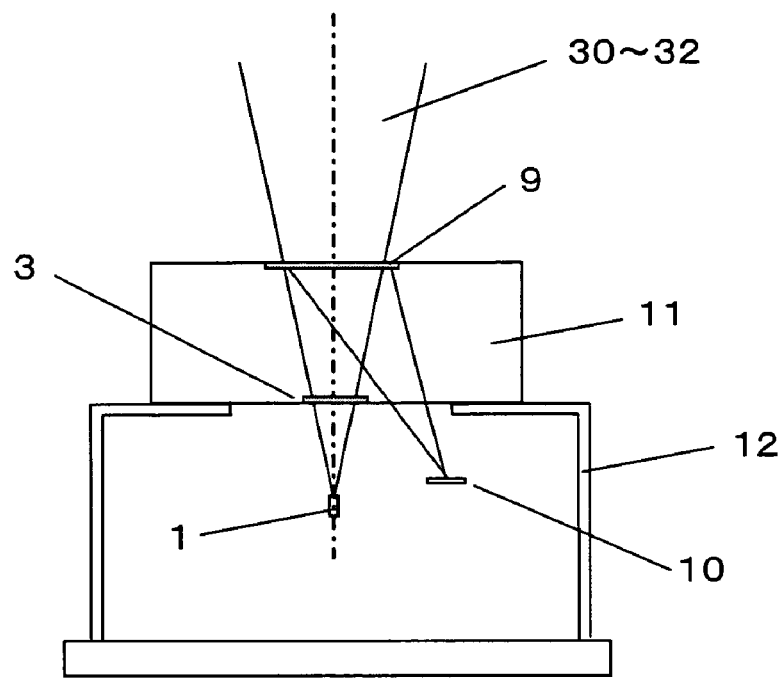
FIG. 29 is an explanatory diagram showing a structure of an integrated hologram laser pickup in accordance with the Seventh Embodiment of the present invention.

FIG. 29 illustrates a single integrated package of the foregoing elements including: a light emitting element realized by the semiconductor laser 1; a light diffraction element of the grating 3; and a photo detection system composed of the hologram 9 and the light receiving element 10 that receive reflected light in areas divided by a dividing line that substantially coincides with the track direction of the optical recording medium.

When focused, the main beam diffracted in the division area 9a of the hologram element 9 forms a beam P1 on a division line 10y, and the main beam diffracted in the division areas 9b and 9c forms beams P2 and P3 respectively in the light receiving regions 10c and 10d.

Moreover, the ±1 st order sub beams diffracted in the division area 9a respectively form beams P4 and P5 outside of the two-part light receiving regions 10a and 10b, and the ±1 st order sub beams diffracted in the division areas 9b and 9c respectively form beams P6 and P7 in the light receiving region 10e and 10f, and beams P8 and P9 in the light receiving regions 10g and 10h.

When the output signals of the light receiving regions 10a, 10b, 10c, 10d 10e 10f 10g and 10h are Ia, Ib, Ic, Id, Ie, If, Ig, and Ih, respectively, a focus error signal FES is calculated by a single knife edge method as follows.

(Ia−Ib)

A tracking error signal TES is calculated by the formula:

TES=(Ic−Id)−k((If−Ih)+((Ie−Ig)).

In the equation of TES, (Ic−Id) is the push-pull signal of the main beam, and (If−Ih) and (Ie−Ig) are respectively the push-pull signals of the ±1 order sub beams.

What is different from the First Embodiment is that only half of the beam is used for the push-pull signal (only the light in the division areas 9b and 9c of the hologram element is used). In FIG. 17, for example, when the division areas 9b and 9c of the hologram element receiving light of the return path are the first quadrant and the second quadrant, respectively, the push-pull signal amplitude needs to be cancelled out to 0 by the subtraction of only the optical outputs of the first and second quadrants.

Figure 30:
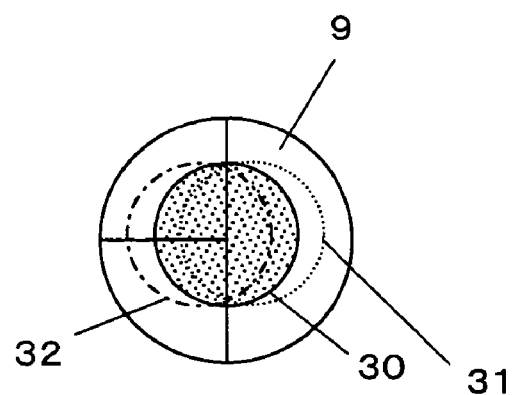
FIG. 30($a$) is an explanatory diagram showing a structure of a hologram element in accordance with the Seventh Embodiment of the present invention, and FIG. 30($b$) is an explanatory diagram showing a structure of a diffraction grating in accordance with the Seventh Embodiment of the present invention.
Figure 30:
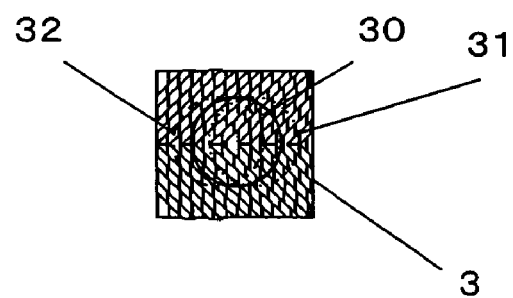
Figure 31:
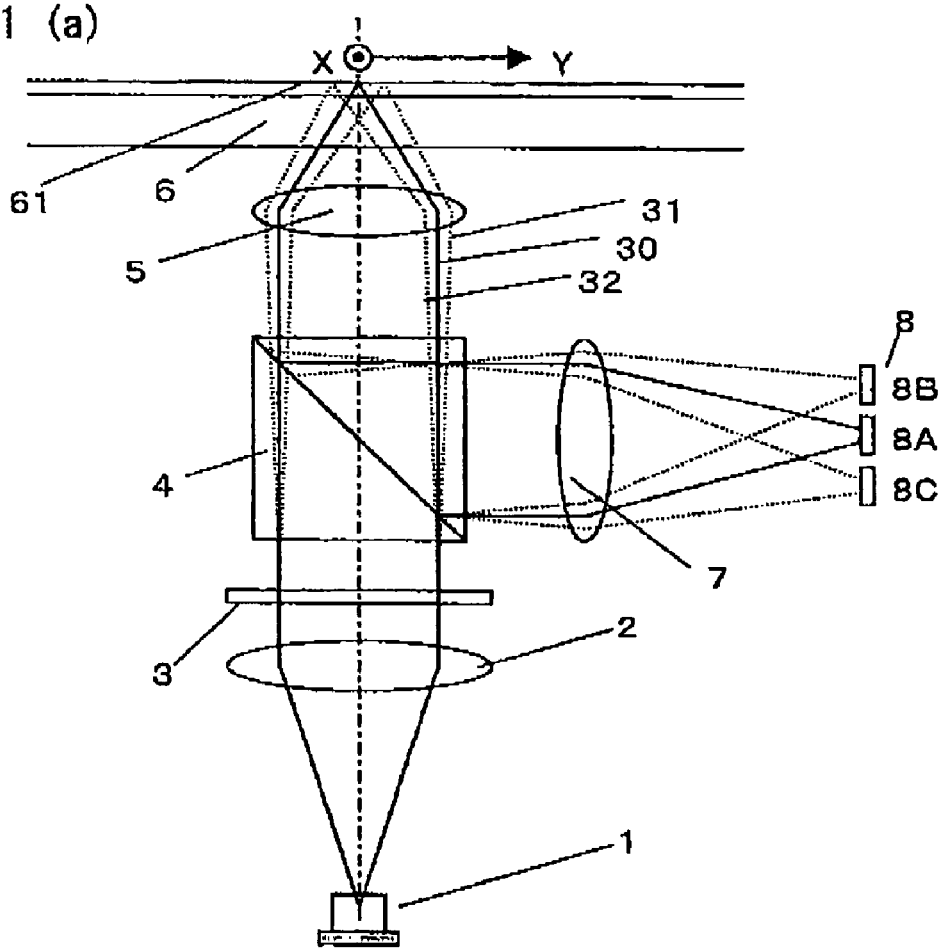
FIG. 31($a$) is a schematic diagram showing a structure of an optical system of a conventional optical pickup, and FIG. 31($b$) is a front view of a grating 3 in the optical system shown in FIG. 31($a$).
Figure 31:
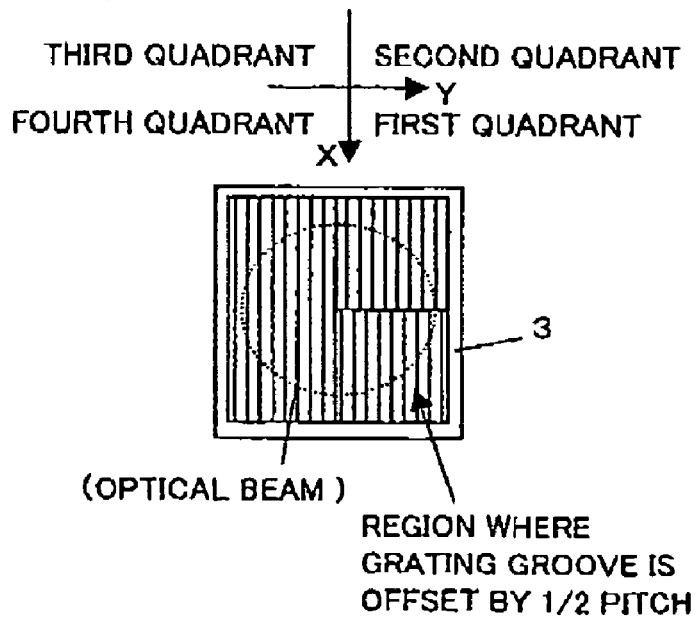
Figure 32:
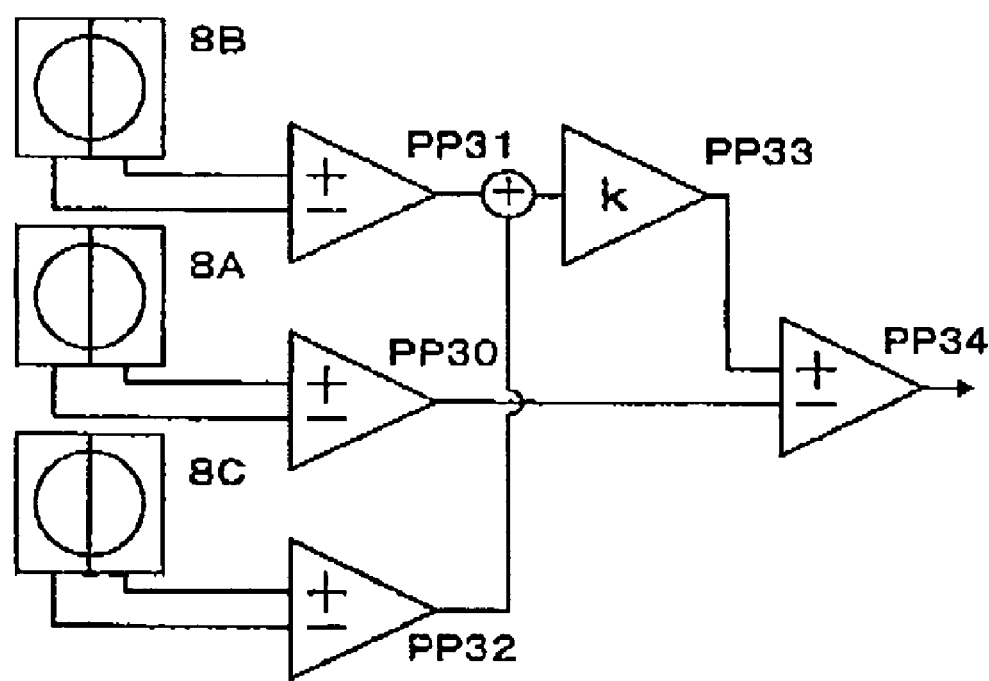
FIG. 32 is an explanatory diagram showing a structure of a detection system of a conventional optical pickup.

In the structure of the hologram laser, since the distance between the light source and the grating is short, the sub beams actually incident on the objective lens 5 are portions of light that are shifted from the main beam 30 on the grating 3 and the hologram 9, as shown in FIG. 30.

The amount of shift varies depending on the positions of the grating and the hologram in the optical axis direction, but it becomes relatively large in a small integrated hologram laser unit. When the amount of shift is small relative to the diameter of the beam so that it can be negligible, a phase difference distribution may be formed around the optical axis to render the same phase distribution to the ±1st order light. However, when the amount of shift is large, design needs to be made taking into account the factor that influences the shift amount.

The conventional examples teach phase difference patterns that are suitable for such cases. In the present invention, the phase difference patterns described in the First through Third embodiments are directly applicable.

The effect of the present invention to suppress the push-pull amplitudes can also be obtained even in an arrangement in which the pattern described in the First Embodiment is mounted in a hologram laser as shown in FIG. 30, and in which the actual position of the sub beams shifts greatly from the main beam on the grating and the push-pull signal is detected through the three-part hologram using only a portion of the beam. Therefore, the present invention is particularly effective for an integrated hologram laser unit in the hologram laser.

Note that, the foregoing embodiments described the case where a phase difference is given to the ±1st order components of the three beams by partially shifting the periodic groove structure of the grating. However, the present invention is not restricted to this, and a transmissive glass plate or a phase difference plate may actually be used.

As described above, an optical pickup of the present invention includes: a light emitting element; a condensing means for condensing on an optical recording medium an optical beam emitted from the light emitting element; an optical diffraction element, provided between the light emitting element and the condensing means, for dividing the optical beam from the light emitting element into three or beam including a main beam and sub beams; and an optical detection system with a light receiving element which receives reflected light from the optical recording medium by dividing the reflected light by a dividing line which substantially coincides with the track direction, the optical diffraction element including a first grating pattern with grooves and lands substantially perpendicular to the track direction of the optical recording medium, and a second grating pattern with grooves and lands that are shifted in pitch from the grooves and lands of the first grating pattern, the first grating pattern and the second grating pattern being tilted.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

An optical pickup of the present invention includes an optical diffraction element which has first and second grating patterns with grooves and lands that are formed along a direction substantially perpendicular to a track direction of an optical recording medium The grooves and lands of the first grating pattern and the grooves and lands of the second grating pattern are shifted from each other by a predetermined pitch in the direction the first and second grating patterns are formed. The first and second grating patterns are formed in the shape of a band and are tilted in a first region and a second region that adjoin substantially perpendicular to the track direction.

Therefore, in the tracking servo method using a phase shift DPP method, the push-pull signal amplitudes of the sub beams can be suppressed even when (i) there is a large shift in the objective lens or position of the grating, (ii) discs of different standards with differing pitches of the groove structure are used, (iii) parameters of the optical systems, such as a lens magnification or an objective lens NA vary, and (iv) a TES is detected using only part of the optical beam in an integrated pickup, such as a hologram laser unit.

As a result, a low-cost pickup can be realized which does not need position adjustment of the sub beams, i.e., rotation adjustment for the three beams. The optical pickup is applicable even when assembly tolerance is large, or when various types of discs oroptical systems are used. Thus, the optical pickup excels especially in mass-productivity and versatility. Moreover, since the optical pickup can correct an offset generated in a tracking signal by reflectivity change, it can be used for a recordable optical disc whose reflectivity changes.

The invention claimed is:

1. An optical pickup comprising:
a light emitting element;
condensing means for condensing on an optical recording medium an optical beam emitted from the light emitting element;
an optical diffraction element, provided between the light emitting element and the condensing means, for dividing the optical beam from the light emitting element into three or more beams including a main beam and sub beams; and
an optical detection system with a light receiving element which receives reflected light from the optical recording medium by dividing the reflected light by a dividing line that substantially coincides with a track direction of the optical recording medium,
wherein:
the optical diffraction element includes first and second grating patterns with grooves and lands that are formed along a direction substantially perpendicular to the track direction of the optical recording medium, the grooves and lands of the first grating pattern and the grooves and lands of the second grating pattern being shifted from each other by a predetermined pitch in the direction the first and second grating patterns are formed, and the first and second grating patterns being formed in the shape of a band and being tilted in a first region and a second region that adjoin in a direction substantially perpendicular to the track direction.

2. The optical pickup in accordance with claim 1, wherein the grooves and lands of the first grating pattern and the grooves and lands of the second grating pattern are shifted from each other by half a pitch of the grooves and lands.

3. The optical pickup in accordance with claim 2, wherein the first grating pattern and the second grating pattern of the optical diffraction element are tilted with respect to a border line substantially parallel to a track of the optical recording medium.

4. The optical pickup in accordance with claim 3, wherein the first grating pattern and the second grating pattern are formed substantially symmetrical about the border line that extends substantially parallel to the track.

5. The optical pickup in accordance with claim 3, wherein the first grating pattern and the second grating pattern are formed asymmetrical about the border line that extends substantially parallel to the track.

6. The optical pickup in accordance with claim 1, wherein the first grating pattern and the second grating pattern of the optical diffraction element are tilted at an angle in a range of from 35 degrees to 55 degrees with respect to the track direction.

7. The optical pickup in accordance with claim 3, wherein the first grating pattern and the second grating pattern are tilted with respect to the border line that extends substantially parallel to the track, so that a sum of tilt angles on both sides of the border line is substantially 90 degrees.

8. The optical pickup in accordance with claim 1, wherein:
the optical pickup accommodates a recordable optical disc with a non-recorded area and a recorded area, and
the first grating pattern and the second grating pattern of the optical diffraction element are tilted at an angle in a range of from 55 degrees to 75 degrees with respect to the track direction.

9. The optical pickup in accordance with claim 1, wherein the first grating pattern and the second grating pattern have a constant width in a direction parallel to the track direction or the optical recording medium, and are periodically formed at regular intervals.

10. The optical pickup in accordance with claim 1, wherein the first grating pattern and the second grating pattern have a constant width in a direction parallel to the track direction of the optical recording medium, and are formed at irregular intervals.

11. The optical pickup in accordance with claim 1, wherein the first grating pattern and the second grating pattern have a width that continuously varies in a direction parallel to the track direction of the optical recording medium.

12. The optical pickup in accordance with claim 1, wherein the first grating pattern and the second grating pattern are formed in edge portions of a region swept by the optical beam emitted from the light emitting element.

13. The optical pickup in accordance with claim 12, wherein the edge portions are separated by a distance L centering on the border line parallel to the track and in a direction perpendicular to the track direction.

14. The optical pickup in accordance with claim 12, wherein a region where the first and second grating patterns are not formed and are swept by the optical beam has grooves and lands that are formed at the same pitch as the first and second grating patterns and in a direction substantially perpendicular to the track direction.

15. The optical pickup in accordance with claim 12, wherein the distance L which separates the first grating pattern and the second grating pattern is 10% to 60% of a diameter of the optical beam that passes there through.

16. The optical pickup in accordance with claim 1, wherein the grooves and lands and the grating patterns are formed so that a strongest intensity peak generates in a central portion of a spot pattern formed on the optical recording medium by the sub beams divided by the diffraction element.

17. The optical pickup in accordance with claim 1, wherein the optical detection system produces a tracking signal using push-pull signals, based on an output of the light receiving element that receives the main beam and the sub beams by dividing the main beam and the sub beams by the dividing line that substantially coincides with the track direction of the optical recording medium,
the optical detection system producing a tracking signal by subtraction of normalized push-pull signals that are obtained by normalizing respective push-pull signals of the main beam and the sub beams with total light quantities of the respective beams.

18. An optical pickup in which an optical beam emitted from a light emitting element is divided into a main beam and sub beams that are condensed on an optical recording medium with an objective lens, and reflected light of the main beam and the sub beams is received by being divided by a dividing line substantially parallel to a track direction so as to detect an optical signal, the optical pickup connecting a tracking error signal offset of the main beam using push-pull signals of the sub beams with a phase difference,
wherein the phase difference is given in such a manner that a region of phase difference by a 0 order component of diffraction light generated by a groove of the optical recording medium and a region of phase difference by ±1st order components of diffraction light generated by a groove of the optical recording medium overlap in a region associated with the push-pull signals of the sub beams.

19. The optical pickup in accordance with claim 18, wherein the phase difference is given in such a manner that amplitudes of the push-pull signals of the sub beams become substantially 0 by the overlapping regions of phase difference.

20. The optical pickup in accordance with claim 18, wherein the phase difference rendered to the sub beams is substantially 180 degrees.

21. An optical pickup in which an optical beam emitted from a light emitting element is divided into a main beam and sub beams that are condensed on an optical recording medium with an objective lens, and reflected light of the main beam and sub beams is received by being divided by a dividing line substantially parallel to a track direction so as to detect an optical signal, the optical pickup correcting a tracking error signal offset of the main beam using the push-pull signals of the sub beams with a phase difference rendered by an optical diffraction element,
wherein the optical diffraction element gives the phase difference in such a manner that a region of phase difference by a 0 order component of diffraction light generated by a groove of the optical recording medium and a region of phase difference by 1st order components of diffraction light generated by a groove of the optical recording medium overlap in a region associated with the push-pull signals of the sub beams.

22. The optical pickup in accordance with claim 21, wherein the optical diffraction element includes first and second grating patterns with grooves and lands that are Conned in a direction substantially perpendicular to the track direction of the optical recording medium, the grooves and lands of the first grating pattern and the grooves and lands of the second grating pattern being shifted by a predetermined pitch in the direction the first and second grating patterns arc formed, and being formed in the shape of a band.

23. The optical pickup in accordance with claim 22, wherein the grooves and lands of the first grating pattern and the grooves and lands of the second grating pattern are shifted from each other by half a pitch of the grooves and lands.

24. The optical pickup in accordance with claim 21, wherein the first and second grating patterns are formed in the shape of a concentric circle or a curve.

25. The optical pickup in accordance with claim 1, comprising a hologram laser unit, which is an integrated single package of: the light emitting element; the optical diffraction element; and the optical detection system, including a hologram and the light receiving element, which receives reflected light by dividing the reflected light by the dividing line that substantially coincides with the track direction of the optical recording medium.

26. The optical pickup in accordance with claim 18, comprising a hologram laser unit, which is an integrated single package of: the light emitting element; the optical diffraction element; and the optical detection system, including a hologram and the light receiving element, which receives reflected light by dividing the reflected light by the dividing line that substantially coincides with the track direction of the optical recording medium.

27. The optical pickup in accordance with claim 21, comprising a hologram laser unit, which is an integrated single package of: the light emitting element; the optical diffraction element; and the optical detection system, including a hologram and the light receiving element, which receives reflected light by dividing the reflected light by the dividing line that substantially coincides with the track direction of the optical recording medium.

28. The optical pickup as set forth in claim 18, wherein in a region where the region of phase difference by the 0 order component of diffraction light and the region of phase difference by the ±1st order components of diffraction light overlap, the region of phase difference is divided into multiple regions.

29. The optical pickup as set forth in claim 18, wherein in a region where the region of phase difference by the 0 order component of diffraction light and the region of phase difference by the ±1st order components of diffraction light overlap, a region of no phase difference is formed between the region of phase difference by the 0 order component of diffraction light and the region of phase difference by the 1st order components of diffraction light.

30. The optical pickup as set forth in claim 18, wherein in a region where the region of phase difference by the 0 order component of diffraction light and the region of phase difference by the ±1st order components of diffraction light overlap, the region of phase difference by the 0 order component of diffraction light and the region of phase difference by the ±1st order components of diffraction light cross each other.

31. The optical pickup as set forth in claim 21, wherein in a region where the region of phase difference by the 0 order component of diffraction light and the region of phase difference by the ±1st order components of diffraction light overlap, the region of phase difference is divided into multiple regions.

32. The optical pickup as set forth in claim 21, wherein in a region where the region of phase difference by the 0 order component of diffraction light and the region of phase difference by the ±1st order components of diffraction light overlap, a region of no phase difference is formed between the region of phase difference by the 0 order component of diffraction light and the region of phase difference by the ±1st order components of diffraction light.

33. The optical pickup as set forth in claim 21, wherein in a region where the region of phase difference by the 0 order component of diffraction light and the region of phase difference by the ±1st order components of diffraction light overlap, the region of phase difference by the 0 order component of diffraction light and the region of phase difference by the ±1st order components of diffraction light cross each other.

* * * * *